(12) United States Patent
Hicks et al.

(10) Patent No.: US 9,891,722 B2
(45) Date of Patent: Feb. 13, 2018

(54) STYLUS-BASED NOTIFICATION SYSTEM

(71) Applicant: BARNES & NOBLE COLLEGE BOOKSELLERS, LLC, Basking Ridge, NJ (US)

(72) Inventors: Kourtny M. Hicks, Sunnyvale, CA (US); Dale J. Brewer, San Marcos, CA (US); Amir Mesguich Havilio, Palo Alto, CA (US); Gerald B. Cueto, San Jose, CA (US)

(73) Assignee: BARNES & NOBLE COLLEGE BOOKSELLERS, LLC, Basking Ridge, NJ (US)

( * ) Notice: Subject to any disclaimer, the term of this patent is extended or adjusted under 35 U.S.C. 154(b) by 196 days.

(21) Appl. No.: 13/793,459

(22) Filed: Mar. 11, 2013

(65) Prior Publication Data

US 2014/0253469 A1    Sep. 11, 2014

(51) Int. Cl.
*G06F 3/0354* (2013.01)

(52) U.S. Cl.
CPC .................. *G06F 3/03545* (2013.01)

(58) Field of Classification Search
CPC ............... G06F 3/03545; G06F 3/0354; G06F 2203/04807
USPC .............. 345/173–184; 178/18.01–20.04
See application file for complete search history.

(56) References Cited

U.S. PATENT DOCUMENTS

| 4,896,543 | A | 1/1990 | Gullman |
|---|---|---|---|
| 5,633,471 | A | 5/1997 | Fukushima |
| 5,844,557 | A | 12/1998 | Shively, II |
| 6,259,438 | B1 | 6/2001 | Fleck et al. |
| 6,956,564 | B1 | 10/2005 | Williams |
| 7,649,524 | B2 | 1/2010 | Haim et al. |
| 7,840,912 | B2 | 11/2010 | Elias et al. |
| 7,898,541 | B2 | 3/2011 | Hong et al. |
| RE42,738 | E | 9/2011 | Williams |
| 8,059,101 | B2 | 11/2011 | Westerman et al. |
| 8,239,413 | B2 | 8/2012 | Hubert |
| 8,274,536 | B2 | 9/2012 | Chaudhri et al. |
| 8,286,104 | B1 | 10/2012 | Yonge-Mallo |

(Continued)

FOREIGN PATENT DOCUMENTS

EP    0722150 A1    7/1996

OTHER PUBLICATIONS

"Adonit Jot Touch (for iPad)," Adonit Jot Touch (for iPad) Review & Rating—PCMag.com; http://www.pcmag.com/article2/0,2817,2411192,00.asp; 6pages, printed from the Internet on Jun. 20, 2013.

(Continued)

*Primary Examiner* — Vinh Lam
(74) *Attorney, Agent, or Firm* — Finch & Maloney PLLC

(57) ABSTRACT

A stylus-based notification system is disclosed. In some embodiments, a stylus configured as described herein is capable of one-way or two-way wireless communication with an electronic device that is paired with the stylus and includes one or more visual features for providing a user with visual notifications and/or feedback. In some cases, for example, a given visual indicator such as an LED ring or other indicator on the stylus that emits light that is visible at any stylus orientation may alert a user that data has been received by the stylus from an associated device and/or sent from the stylus to such device.

20 Claims, 7 Drawing Sheets

(56) References Cited

U.S. PATENT DOCUMENTS

| | | | |
|---|---|---|---|
| D670,713 S | 11/2012 | Cranfill et al. | |
| RE44,103 E | 3/2013 | Williams | |
| 8,400,417 B2 | 3/2013 | Ording et al. | |
| 8,508,494 B2 | 8/2013 | Moore | |
| 2001/0025289 A1 | 9/2001 | Jenkins et al. | |
| 2002/0116421 A1 | 8/2002 | Fox et al. | |
| 2005/0024346 A1* | 2/2005 | Dupraz | G06F 3/03545 345/179 |
| 2006/0176287 A1* | 8/2006 | Pittel | G06F 1/3203 345/179 |
| 2007/0047002 A1 | 3/2007 | Hull et al. | |
| 2008/0036747 A1 | 2/2008 | Hope | |
| 2009/0146975 A1* | 6/2009 | Chang | G06F 3/03545 345/179 |
| 2009/0153367 A1* | 6/2009 | Lee | G06F 3/03545 341/20 |
| 2009/0251441 A1* | 10/2009 | Edgecomb | G06F 3/03545 345/179 |
| 2010/0100854 A1 | 4/2010 | Russell et al. | |
| 2010/0192086 A1 | 7/2010 | Kocienda et al. | |
| 2010/0229130 A1 | 9/2010 | Edge et al. | |
| 2010/0245294 A1* | 9/2010 | Piersol | G06F 3/041 345/179 |
| 2010/0259482 A1 | 10/2010 | Ball | |
| 2010/0262659 A1 | 10/2010 | Christiansen et al. | |
| 2010/0318895 A1 | 12/2010 | Steinberger et al. | |
| 2011/0007037 A1* | 1/2011 | Ogawa | G06F 3/03545 345/179 |
| 2011/0234549 A1* | 9/2011 | Matsumoto | G06F 3/03545 345/179 |
| 2011/0258542 A1 | 10/2011 | Kenney et al. | |
| 2012/0056821 A1 | 3/2012 | Goh | |
| 2012/0127110 A1 | 5/2012 | Amm et al. | |
| 2012/0139879 A1 | 6/2012 | Kim et al. | |
| 2012/0146913 A1* | 6/2012 | Linn | G06F 3/03545 345/169 |
| 2012/0221938 A1 | 8/2012 | Patterson et al. | |
| 2012/0235901 A1 | 9/2012 | Binder | |
| 2012/0242579 A1 | 9/2012 | Chua | |
| 2012/0242584 A1 | 9/2012 | Tuli | |
| 2012/0249768 A1 | 10/2012 | Binder | |
| 2012/0280947 A1 | 11/2012 | Weaver et al. | |
| 2012/0293463 A1* | 11/2012 | Adhikari | G06F 3/03546 345/179 |
| 2012/0311438 A1 | 12/2012 | Cranfill et al. | |
| 2012/0329529 A1 | 12/2012 | van der Raadt | |
| 2013/0016045 A1 | 1/2013 | Zhao et al. | |
| 2013/0036383 A1 | 2/2013 | Yuan et al. | |
| 2013/0063364 A1 | 3/2013 | Moore | |
| 2013/0076632 A1 | 3/2013 | Sirpal et al. | |
| 2013/0076637 A1 | 3/2013 | Teltz | |
| 2013/0076638 A1 | 3/2013 | Sirpal et al. | |
| 2013/0076781 A1 | 3/2013 | Sirpal et al. | |
| 2013/0113699 A1 | 5/2013 | Lim | |
| 2013/0120271 A1 | 5/2013 | Lee et al. | |
| 2013/0135234 A1 | 5/2013 | Hisano et al. | |
| 2013/0139078 A1 | 5/2013 | Chuang et al. | |
| 2013/0139107 A1 | 5/2013 | Jung | |
| 2013/0162532 A1 | 6/2013 | Cheng et al. | |
| 2013/0169574 A1* | 7/2013 | Suh | G06F 3/0488 345/173 |
| 2013/0185680 A1 | 7/2013 | Chaudhri et al. | |
| 2013/0194308 A1 | 8/2013 | Privault et al. | |
| 2014/0028577 A1* | 1/2014 | Krah | G06F 3/0416 345/173 |
| 2014/0078119 A1* | 3/2014 | Cao | G06F 3/03545 345/179 |
| 2014/0085269 A1* | 3/2014 | Armstrong-Muntner | G06F 3/03545 345/179 |
| 2014/0092069 A1* | 4/2014 | Bentov | G06F 1/26 345/179 |
| 2014/0098070 A1* | 4/2014 | Pemberton-Pigott | G06F 3/0325 345/179 |
| 2014/0137015 A1* | 5/2014 | Gurtler | G06F 3/03545 715/765 |
| 2014/0146021 A1* | 5/2014 | Trethewey | G06F 3/0488 345/179 |
| 2014/0168177 A1* | 6/2014 | Mkrtchyan | G06F 3/03545 345/179 |
| 2014/0176511 A1* | 6/2014 | Lin | G06F 3/03545 345/179 |
| 2014/0324809 A1* | 10/2014 | Rajkumar | G06F 17/30648 707/706 |

OTHER PUBLICATIONS

Volpe, Joseph, Amazon patents intelligent pen for adding annotations to digital and printed media (updated), posted Mar. 6, 2012 at 5:39PM, http://www.engadget.com/2012/03/06/amazon-patents-intelligent-pen/, 3 pages, printed from the Internet on Jun. 20, 2013.

"Apple Secretly Filed Three Dynamic Smart Pen Patents in Europe that are Chock Full of Cool Ideas," http://www.patentlyapple.com/patently-apple/2013/02/apple-secretly-filed-three-dynamic-smart-pen-patents-in-europe-that-are-chock-full-of-cool-ideas.html, originally published Feb. 28, 2013, 13 pages, printed from the Internet on Aug. 13, 2013.

"Bamboo Stylus," Wacom Americas, http://www.wacom.com/en/products/stylus, 5 pages, printed from the Internet on Jun. 20, 2013.

Robertson, Adi, "Blue Tiger pressure-sensitive iOS stylus will work over Bluetooth 4.0," http://www.theverge.com/2012/3/7/2851562/blue-tiger-ten-one-design-pressure-sensitive-bluetooth-4-0-stylus, 1 page, printed from the Internet on Aug. 2, 2013.

Malacria, et al., "Clutch-Free Panning and Integrated Pan-Zoom Control on Touch-Sensitive Surfaces: The CycloStar Approach," CHI 2010, Apr. 10-15, 2010, Atlanta, Georgia, USA. Copyright 2010 ACM 978-1-60558-929-9, 10 pages, Sep. 10, 2004.

"Pen," DuoSense Pen, N-trig Hands-on computing, http://www.n-trig.com/Content.aspx?Page=DigitalPencil, 3 pages, printed from the Internet on Jun. 20, 2013.

"Easing functions," Easing Functions Cheat Sheet, http://easings.net/, 3 pages, printed from the Internet on Jun. 17, 2013.

Kirupa, Easing Functions (aka Timing Functions) in CSS3, printed Apr. 3, 2013, kirupa.com, http://www.kirupa.com/html5/easing_functions_css3.htm, 16 pages, printed from the Internet on Jun. 18, 2013.

"EMR (Electro-Magnetic Resonance) Technology—The De Facto Standard for Pen Tablet Devices is Realized using EMR Technology," Wacom Components : Input Technology : EMR Technology, http://wacom-components.com/english/technology/emr.html, 5 pages, printed from the Internet on Aug. 2, 2013.

"Simultaneous Pen & Touch: The Natural Way to Work," Perceptive Pixel Active Stylus, www.perceptivepixel.com/_literature_136086/Active_Stylus, 2 pages, printed from the Internet on Dec. 14, 2012.

"Future Apple Notebooks & Tablets may use Acoustic Commands—Patently Apple," originally published Feb. 18, 2011, http://www.patentlyapple.com/patently-apple/2011/02/future-apple-notebooks-tablets-may,6 pages, printed from the Internet on Nov. 3, 2012.

"Guidelines for selecting text and images (Windows Store apps)," http://msdn.microsoft.com/en-us/library/windows/apps/hh465334, 5 pages, printed from the Internet on Jun. 20, 2013.

Lutz, Zachary, "Hands-on with wireless, ultrasonic stylus an touchless gestures at MWC (video)," posted Mar. 1, 2012 at 8:28 AM, http://www.engadget.com/2012/03/01/hands-on-with-wireless-ultrasonic-stylus-and-touchl, 3 pages, printed from the Internet on Jun. 20, 2013.

"HEX3 JaJa Pressure Sensitive Stylus," HEX3 JaJa Pressure Sensitive Stylus Review & Rating—PCMag.com, http://www.pcmag.com/article2/0,2817,2411194,00.asp, 6 pages, printed from the Internet on Jun. 20, 2013.

(56) References Cited

OTHER PUBLICATIONS

"How do WACOM tablets work?," tablet4u.co.uk, http://www.tablet4u.co.uk/techinfo.html, 2 pages, printed from the Internet on Jun. 20, 2013.

Kim, Arnold, "Multi-Touch Page Flipping eBook Concept Shown on an iPad," posted Jan. 22, 2012 at 10:52pm PST, MacRumors—news and rumors you care about, http://www.macrumors.com/2012/01/23/multi-touch-page-flipping-ebook-concept-shown-6 pages, printed from the Internet on Nov. 3, 2012.

"Desktop Touchscreens,"—Desktop touchscreens explained, http://www.touchscreenmagazine.nl/touchscreen-solutions/desktop-touchscreens, 1 page, printed from the Internet on Nov. 3, 2012.

"MTStylus Wireless Stereo Stylus for iPhone/Andriod Phone & Tablet," dexim-MTStylus Wireless Stereo Stylus, http://www.dexim.net/content.php?id=165&pid=11, 2 pages, printed from the Internet on Jun. 20, 2013.

"Padblue 2," BRANDO—mobile.brando.com, http://mobile.brando.com/Padblue-2_p9162c1577d94.html., 4 pages, printed from the Internet on May 10, 2013.

Fingas, Jon, "Panasonic mobile devices to use Anoto's pattern-based pen input technology," posted Jan. 8, 2013 at 1:00PM, http://www.engadget.com/2013/01/08/panasonic-mobile-devices-to-use-anoto-pattern-pen-, 4 pages, printed from the Internet on Jun. 20, 2013.

"Bluetooth 4.0 SmartPen the future just got a little brighter," Pogo Connect, http://tenonedesign.com/connect.php, 7 pages, printed from the Internet on Jun. 20, 2013.

Quick, Darren, "Pressure sensitive technology set to bring 3D capability to touchscreens," posted on Jan. 31, 2010, Mobile Technology, http://www.gizmag.com/new-touchscreen-technology, 4 pages, printed from the Internet on Aug. 2, 2013.

Rigg, Jamie, "Sony tries to patent stylus with friction-based haptic feedback," posted on Nov. 22, 2012 at 9:50 AM, http://www.engadget.com/2012/11/22/sony-haptic-feedback-stylus-patent/, 2 pages, printed from the Internet on Jun. 20, 2013.

"Stylus Hanging Bluetooth Headset," BRANDO—mobile.brando.com, http://mobile.brando.com/prod_detail.php?prod_id=03291, 4 pages, printed from the Internet on May 10, 2013.

"The JukeStyle is a great budget stylus for your iOS devices," stylus Archives—iPad News, http://www.ipadnews.nl/tag/stylus/, 44 pages, printed from the Internet on Jun. 20, 2013.

Lavrinc, Damon, "Why Flipping Through Paper-Like Pages Endures in the Digital World," originally posted on May 11, 2012 at 3:48PM, Gadget Lab, http://www.wired.com/gadgetlab/2012/05/why-flipping-through-paper-like-pages-endures-in-the-digital-world/, 5 pages, printed from the Internet on May 6, 2013.

Bragdon, et al., "Experimental Analysis of Touch-Screen Gesture Designs in Mobile Environments", Proceedings of the SIGCHI Conference on Human Factors in Computing Systems, pp. 403-412 (2011).

"Gesture Search for Google Mobile", Google Mobile, www.google.com/mobile/gesture-search, 1 page, printed from the Internet on Dec. 26, 2012.

"Comics by comiXology," Comic Book Reader Guide, http://www.comicbookreaderguide.com/comics-by-comixology/, 24 pages, printed from the Internet on May 6, 2013.

"NFC Forum: Frequently Asked Questions," http://www.nfc-forum.org/resources/faqs#acknowledge, 11 pages, printed from the Internet on Feb. 18, 2013.

"How to Remote Wipe an iPhone or iPad," OSXDaily, http://osxdaily.com/2012/06/05/remote-wipe-iphone-or-ipad/, 4 pages, printed from the Internet on Feb. 2, 2013.

"Screen hotspot," Wikipedia, the free encyclopedia, http://en.wikipedia.org/wiki/Screen_hotspot, 1 pages, printed from the Internet on May 15, 2013.

"PAiA-Touch Switches," PAiA Corporation USA, file:///S:/Client%20Files/Barnes%20&%20Noble/IDS%20Master%20Folder/S&G%20-%2 . . . , 3 pages, printed from the Internet on Aug. 27, 2013.

Kanai, et al., "Intra-Rendition Navigation," Copyright 2012-2013 International Digital Publishing Forum (IDPF), 13 pages.

"Explaining how the sPen tech works (and is very diff than other styluses), http://forum.xda-developers.com/showthread.php?t=," 1 page, printed from the Internet on Jan. 15, 2013.

\* cited by examiner

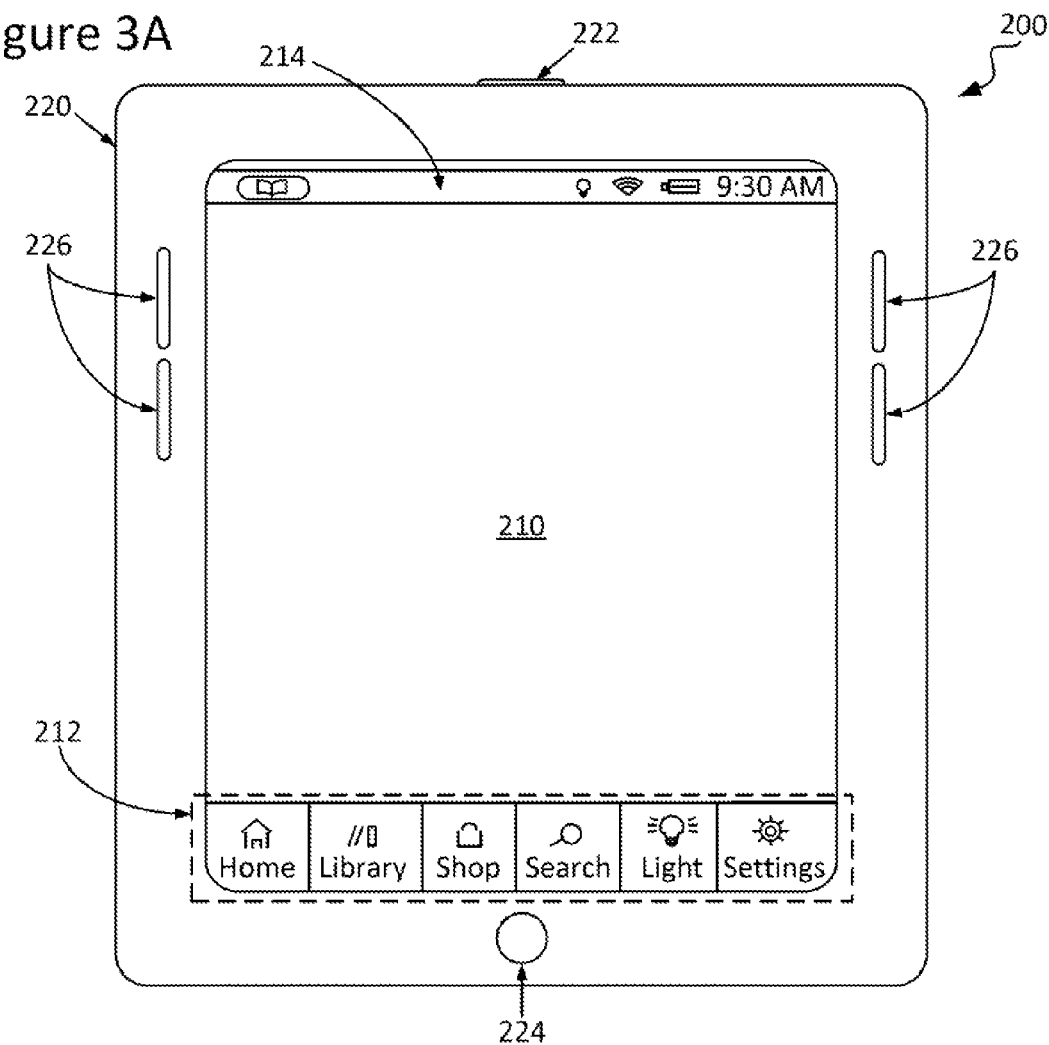
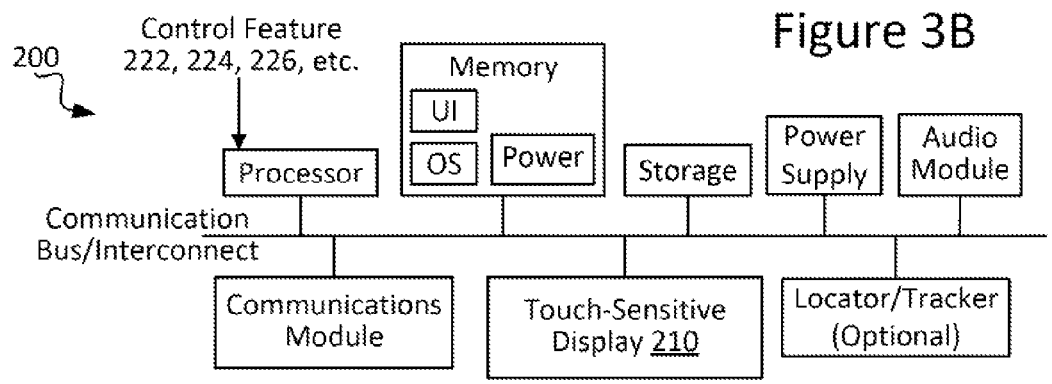

STYLUS-BASED NOTIFICATION SYSTEM

FIELD OF THE DISCLOSURE

The disclosure relates to electronic computing devices and more particularly to a stylus-based notification system for use with such devices.

BACKGROUND

Electronic display devices such as tablets, eReaders, mobile phones, smartphones, personal digital assistants (PDAs), and other such touchscreen electronic display devices are commonly used for displaying consumable content. The content may be, for example, an e-book, an online article or blog, images, documents, a movie or video, etc., just to name a few types. Such devices are also useful for displaying a user interface that allows a user to interact with the displayed content. The user interface may include, for example, one or more touchscreen controls and/or one or more displayed labels that correspond to nearby hardware buttons. The user may interact with the touch-sensitive device using fingers, a stylus, or other implement. The touchscreen display may be backlit or not and may be implemented, for instance, with a light emitting diode (LED) screen or an electrophoretic display. Such devices also may include other touch-sensitive surfaces, such as a track pad (e.g., a capacitive or resistive touch sensor) or touch-sensitive housing (e.g., acoustic sensor).

BRIEF DESCRIPTION OF THE DRAWINGS

FIG. 3A is a front view of an example electronic device having a touch-sensitive display with which a stylus may interact, in accordance with an embodiment of the present invention.

FIG. 3B is a block diagram representing an example electronic device configured in accordance with an embodiment of the present invention.

DETAILED DESCRIPTION

Figure 1A:
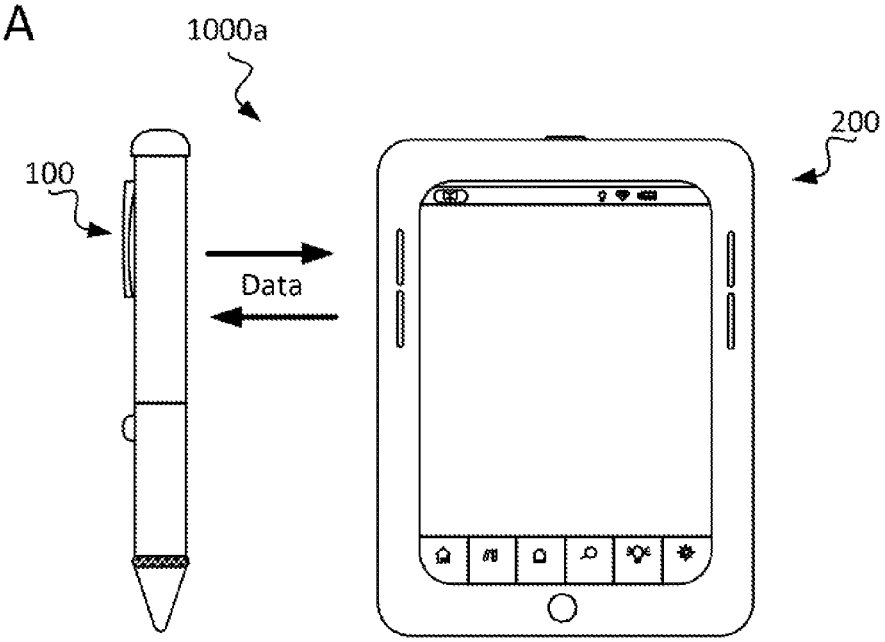
FIG. 1A illustrates a stylus-based notification system configured in accordance with an embodiment of the present invention.

A stylus-based notification system is disclosed. In some embodiments, a stylus configured as described herein is capable of one-way or two-way wireless communication with an electronic device that is paired with the stylus and includes one or more visual indicators for providing a user with visual notifications. The notifications may be, for instance, with respect to a received message, the currently active tool, the currently active stylus mode, the current color selection, or a schedule/appointment reminder. In some cases, for example, a given visual indicator such as an LED ring or other readily viewable indicator on the stylus may alert a user that a notification has been received by the computing device, or that a given stylus-based command to the device is being (or has been) performed. With respect to a received notification, the color of the visual indicator can be used to indicate the importance of that notification. In some embodiments, the visual indicator is viewable by the user regardless of stylus position (e.g., no blind spots). In some instances, the user may input data to the device using the stylus, and review/confirmation of such input may be provided by a given visual indicator of the stylus. Settings and user preferences for the visual indicator(s) of a stylus configured as described herein may be customized, as desired. Numerous configurations and variations will be apparent in light of this disclosure.

General Overview

As previously explained, electronic display devices such as tablets, eReaders, smartphones, etc., are commonly used for displaying user interfaces and consumable content. In many cases, such devices include a touch-sensitive user interface (UI), and the user may have a related stylus that can be used to interact with the device via that UI. In general, the stylus is an alternative implement to the user's finger when navigating on a given device, which may be preferred by some users in some contexts. Beyond such usages, benefits of a stylus are relatively limited. For instance, if the user has left the device in an out-of-reach location (e.g., in a locker, backpack, briefcase, office, car, etc.) for whatever reason, the stylus serves no purpose without immediate access to the device.

Thus, and in accordance with an embodiment of the present invention, a stylus-based notification system is disclosed. In some embodiments, the stylus is configured with a wireless communication module and one or more visual indicator features for presenting information to a user. The communication module may be capable of one-way or two-way wireless communication with an electronic computing device that is paired with the stylus. The computing device may be, for example, a tablet, an eReader, a mobile phone, a laptop, a desktop, or any other mobile or non-mobile device that can be paired with the stylus. In any such cases, notifications from the computing device can be synced to or otherwise received by the stylus, thereby allowing the user to receive notifications via the stylus even when the computing device is stowed away (such as in the user's backpack, briefcase, office, car, etc. while the user is attending and focusing on a lecture). From the notification, the user will know that the associated computing device has, for example, received information which a user may wish to consider (e.g., a message from a social network, an update with respect to a study group meeting time, a reminder regarding upcoming class time, etc.), or received and successfully processed a stylus-based command.

In some example embodiments, the visual indicator feature is configured so that it can be viewed by the user regardless of stylus position (e.g., no blind spots). For instance, a multicolor LED ring can be configured around the nozzle of the stylus which can light up and change color when there is some incoming notification from the computing device. Likewise, the multicolor light ring or other suitable 360 degree viewable visual indicator (such as a stylus end-cap with a multicolor LED therein) can be used to provide user with feedback while the user is using the stylus to interact with the computing device, such as to inform the user that, for example, a particular requested action was performed (e.g., a file was successfully deleted, or a hand-written note drawn on a touch screen of the computing device was successfully converted to a text file) or that a stylus mode has changed (e.g., from pen mode to mouse mode) or that the computing device is off or locked.

Numerous uses will be apparent in light of this disclosure. With respect to an incoming notification, a color on the visual indicator could indicate the importance of the notification. For instance, if the user indicated importance with respect to a given notification via a user customization or if a student receives a notification that something is due that day, then the color of the visual indicator could be set to red or some other color that informs the user of the intended importance level. In some such embodiments, the user can assign meaning to various notification colors via a settings menu. The importance could be based on any number of factors, as determined by the user or otherwise programmed by default. For instance, in one example scenario, any notification coming from Application A (e.g., text messaging app) could always show as red. Similarly, if a notification is from a specific person or group, the user could assign colors to those individuals or groups. With respect to providing user feedback, an example use case would be where the user is using a particular tool, like a highlight or note taking tool, and the tool allows for the user to choose from multiple colors when creating a highlight or a note. In such cases, the visual indicator could show which color highlight or note color is the current default color. Such feedback is particularly helpful when it can be viewed regardless of stylus position.

In some embodiments, icons can be used to denote different messages. In such cases, the icons could be displayed on the computing device and/or on the stylus itself if the stylus is configured with a display (e.g., LED or electrophoretic display). For instance, if the user changes the stylus mode from pen mode to mouse mode (or vice-versa), the icon could reflect the appropriate one of pen input or mouse input. Likewise, if a user changes tools such as when the user switches to a highlight tool, note tool, copy/paste tool, dictionary lookup tool, audio recording tool, or any other such functionally usable tool, then a certain icon could appear on device and/or on a stylus-based display to reflect that particular tool so the user could be sure that she/he was in the correct tool.

In some instances, the stylus may be further configured with physical and/or virtual control features that can be used for providing control signals to the related computing device, so as to alter or otherwise control the performance/behavior of the electronic device. Thus, a user may be able to interact with or otherwise operate a related electronic computing device even while such device is out of reach or otherwise physically inaccessible to the user. In some instances, syncing of the electronic device and the stylus may be achieved without the stylus and device being proximate one another, so long as a wireless communication link between the stylus and device can be established. Numerous configurations and communication scenarios will be apparent in light of this disclosure, and the claimed invention is not intended to be limited to any particular types.

In general, a stylus as described herein may be any pen-like implement configured to interact with a touch-sensitive surface of an electronic device, either by direct contact on that surface or by proximate contact with that surface, wherein the contact is sensed by the electronic device and converted into an electrical signal that can be processed thereby. In some cases, a stylus provided using the disclosed techniques can be configured, for example, as: (1) a partially/completely assembled computing stylus or digital pen unit; and/or (2) a kit or other collection of discrete components (e.g., stylus structure, one or more visual indicators, one or more optional displays, supporting circuitry/componentry) which may be operatively coupled as desired.

System Architecture

Figure 1B:
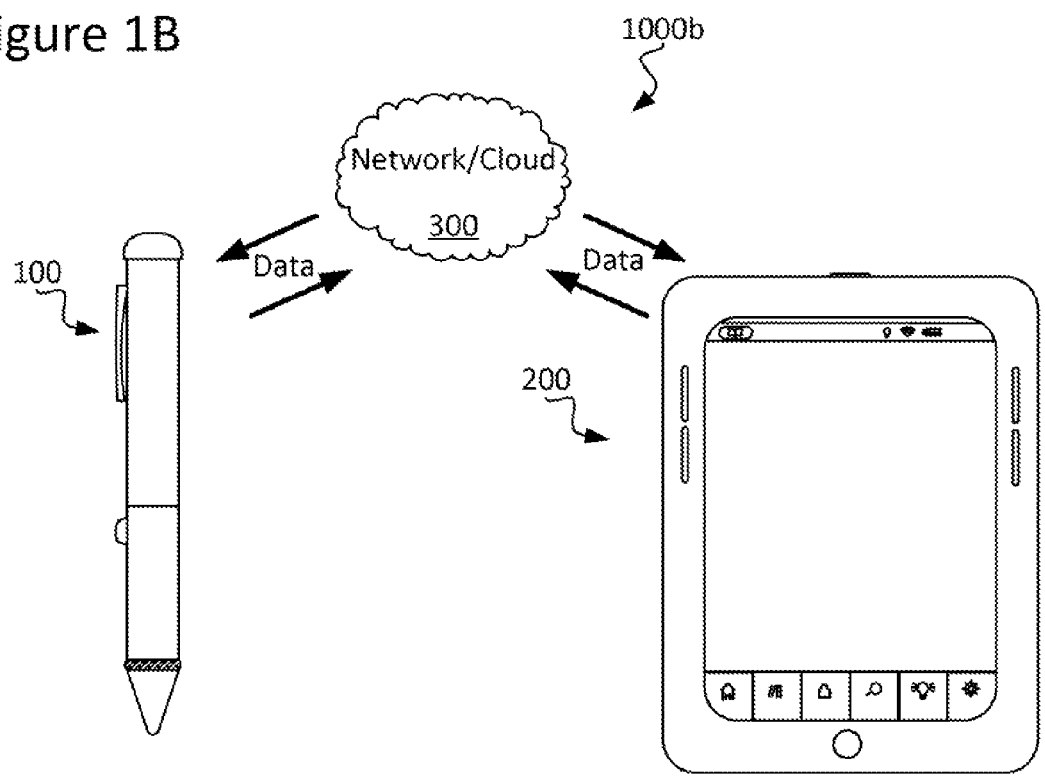
FIG. 1B illustrates a stylus-based notification system configured in accordance with another embodiment of the present invention.

FIG. 1A illustrates a stylus-based notification system 1000*a* configured in accordance with an embodiment of the present invention, and FIG. 1B illustrates a stylus-based notification system 1000*b* configured in accordance with another embodiment of the present invention. As can be seen, system 1000*a*/1000*b* (generally referred to as 1000 hereinafter, unless referring to one system specifically) includes a stylus 100 and an electronic device 200 which are communicatively coupled with one another. In some instances, stylus 100 may be directly communicatively coupled with device 200, as is generally depicted by FIG. 1A. However, in some other instances, stylus 100 and device 200 may be indirectly communicatively coupled with one another by an intervening or otherwise intermediate network/cloud 300, for facilitating the transfer of data between stylus 100 and device 200, as is generally depicted by FIG. 1B.

Device 200 may be, for example, a tablet, an eReader, a mobile phone, a laptop, a desktop, or any other mobile or non-mobile device that can be paired with the stylus 100. The stylus 100 is capable providing user input to the device 200 in a normal stylus fashion. In addition, the stylus 100 is capable of receiving notifications and feedback from the device 200 and manifesting those notifications and feedback to the user via one or more visual indicators. Further details with respect to stylus 100 and device 200 will be provided in turn, with reference to FIGS. 2A-5.

Network/cloud 300 may be, for example, any suitable communications network. For instance, network/cloud 300 may be a public and/or private network, such as a private local area network (LAN) operatively coupled to a wide area network (WAN) such as the Internet. In some embodiments, the network 300 may include one or more cellular networks. Furthermore, and in accordance with some embodiments, system 1000 may be configured for one-way communication between stylus 100 and device 200 (e.g., data may be passed one way from device 200 to stylus 100 or from stylus 100 to device 200) or for two-way communication there between (e.g., data may be passed from device 200 to stylus 100 and vice versa). In some cases, the network/cloud 300 may include supporting infrastructure and/or functionalities such as a server and a service provider, but such features are not necessary to carry out communication via the network 300.

Figure 2A:
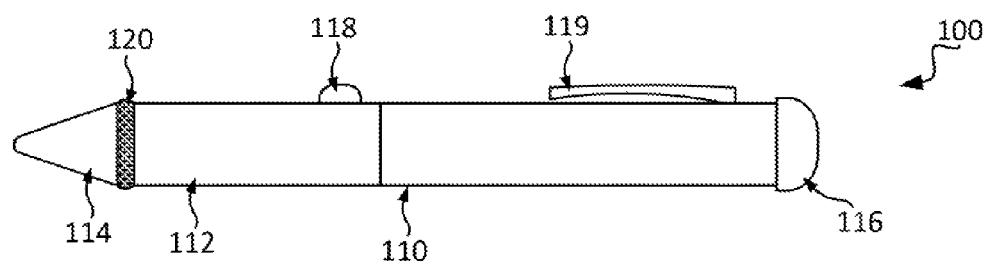
FIG. 2A illustrates a stylus configured in accordance with an embodiment of the present invention.

FIG. 2A illustrates a stylus 100 configured in accordance with an embodiment of the present invention. As can be seen, stylus 100 generally may include, for example, a body/barrel portion 110, a grip portion 112, and a tip portion 114. In some embodiments, stylus 100 also optionally may include an end portion 116 (e.g., generally positioned distally opposite tip portion 114). As will be apparent in light of this disclosure, and in accordance with one or more embodiments, the body/barrel portion 110, grip portion 112, tip portion 114, and end portion 116 (when included) of stylus 100 may be provided with any desired configuration suitable for a given target application or end-use. Also, stylus 100 may include or otherwise be constructed, in part or in whole, from any material(s) which provide stylus 100, for example, with sufficient structural resilience, electrical conductivity (if desired), and user comfort, as will be further apparent in light of this disclosure. Furthermore, the dimensions (e.g., length, width/diameter, weight, etc.) of stylus 100 may be customized as desired. In any case, stylus 100 can be configured to interact (e.g., by direct contact, or by hovering or otherwise sufficiently proximate contact such as within a few centimeters) with an electronic device 200 having a touch-sensitive surface that is sensitive to stylus-based user input. To that end, and in accordance with one or more embodiments, stylus 100 generally may be configured as a resistive stylus, a capacitive stylus, an active stylus, or suitable configuration for interacting with a touch-sensitive device 200.

Figure 2B:
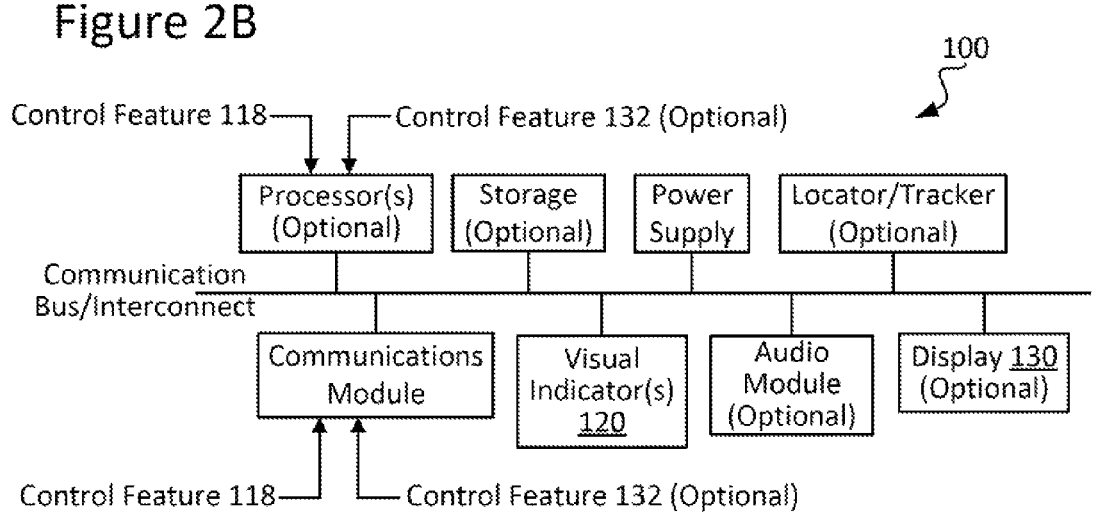
FIG. 2B is a block diagram representing an example stylus configured in accordance with an embodiment of the present invention.

FIG. 2B is a block diagram representing an example stylus 100 configured in accordance with an embodiment of the present invention. As can be seen, this example stylus 100 includes a processor, storage componentry, a communications module, one or more visual indicators 120, a power supply, an audio module, a locator/tracker module, and one or more displays 130. A communications bus/interconnect is provided to allow for communication between the various components of stylus 100. As will be appreciated in light of this disclosure, other stylus embodiments may include fewer components (e.g., communications module and a visual indicator only) while other embodiments may include other components not shown (e.g., microphone, haptic feedback module).

In some embodiments, one or more processors can be configured, for example, to process data received from device 200 and/or from user input, to process data that is outbound for device 200, to execute applications/programs stored on stylus 100, to decode and/or render images and graphics for display on a given display 130, or otherwise locally control functionality of the stylus. In some cases, a given processor of stylus 100 may be configured to receive and interpret signals from any control features 118/132 of stylus 100. It should be noted, however, that a processor may be omitted altogether from stylus 100 (e.g., such as when the electronic device 200 with which stylus 100 is communicatively coupled provides sufficient control/direction). Other suitable configurations and/or capabilities of the one or more optional processors of stylus 100 will depend on a given application and will be apparent in light of this disclosure.

The communications module can be, for instance, any suitable module which allows for connection to the electronic computing device so that information may be passed between the device and the stylus. Some example suitable wireless communication methods that can be implemented by the communications module of stylus 100 include, but are not necessarily limited to, radio frequency (RF) communications (e.g., Wi-Fi®, Bluetooth®, near field communication or NFC), IEEE 802.11 wireless local area network (WLAN) communications, infrared (IR) communications, cellular data service communications, satellite Internet access communications, custom/proprietary communication protocol, and/or any combination thereof. In some embodiments, a given stylus 100 may be capable of utilizing multiple methods of wireless communication. In some such cases, the multiple wireless communication techniques may be permitted to overlap in function/operation, while in some other cases they may be exclusive of one another. Numerous suitable configurations will be apparent in light of this disclosure. Note that each of the stylus 100 and device 200 can be associated with a unique ID (e.g., MAC address, cell number, or other such identifier) that can be used to assist the communicative coupling of the stylus 100 and device 200 over a network or when the stylus 100 and device 200 are remote from one another or otherwise sufficiently far apart but still network accessible. In a more general sense, the communications module can be configured to execute any suitable protocol (e.g., LAN-based, Internet-based, cellular-based, satellite-based, or any combination thereof) which allows for connection of stylus 100 with a paired device 200 such that data can be wirelessly communicated there between (e.g., in one direction or in both directions).

In some instances, the suitability of a given wireless communication technique may depend, at least in part, on the relative distance between stylus 100 and the associated device 200. Thus, it may be desirable, in some instances, to provide stylus 100 with the ability to switch the currently active wireless communication type, for example, as the relative distance between the stylus 100 and device 200 changes. For instance, if stylus 100 and associated electronic device 200 are sufficiently proximate one another (e.g., separated by a relatively small distance), then one or more appropriate close-range wireless communication techniques may be employed (e.g., Wi-Fi®, Bluetooth®, IR, etc.). If instead a relatively large distance separates the stylus 100 and associated device 200, then other longer-range communication techniques may be employed (e.g., cellular data service, satellite internet access, etc.). It should be noted, however, that wireless communication methods which otherwise might be reserved for long-range communication are not intended to be excluded from use when stylus 100 and device 200 are relatively proximate one another (e.g., cellular data service can be used when stylus 100 and device 200 are within a few feet of each other). Other suitable techniques for wireless communication between stylus 100 and an associated device 200 will depend on a given application and will be apparent in light of this disclosure.

As discussed above in the context of FIGS. 1A-1B, wireless communication may occur directly between stylus 100 and device 200 without an intervening network/cloud 300 or other device(s) in some cases, while in some other cases communication may occur indirectly between stylus 100 and device 200 through an intermediate network/cloud 300 or other device(s). Also, as previously noted, the claimed invention is not limited only to wireless communication between stylus 100 and a paired device 200, as in some cases, a wired connection (e.g., USB, Ethernet, FireWire, or other suitable wired interfacing) may be provided there between. Numerous configurations will be apparent in light of this disclosure.

In accordance with some embodiments, stylus 100 may include one or more visual indicators 120. It should be noted that while FIG. 2A generally depicts a stylus 100 including a single, continuous visual indicator 120, the claimed invention is not so limited, as in some other embodiments, multiple visual indicators, partitioned/sectioned visual indicators, or discontinuous or spaced visual indicators, alternatively or additionally may be implemented with stylus 100. In any such case, a given visual indicator 120 of stylus 100 may utilize any of a wide variety of lighting techniques and components. For instance, in some embodiments, a given visual indicator 120 may be or otherwise may include a semiconductor light source or other solid-state lighting device. Some example suitable light sources include, but are not necessarily limited to, light-emitting diodes (LEDs) (e.g., single and/or multiple colors), organic light emitting diodes (OLEDs), polymer light emitting diodes (PLEDs), electroluminescent (EL) strips, and/or any combination thereof. In accordance with one or more embodiments, a given visual indicator 120 may be configured to produce one or more colors, intensities, patterns, etc., of light of any desired spectral range (e.g., visible, infrared, ultraviolet, etc.), as desired for a given target application or end-use. Other suitable light engine types, configurations, and emission spectra for a given visual indicator 120 will depend on a given application and will be apparent in light of this disclosure.

In some embodiments, a given visual indicator 120 may be configured as or otherwise may include structure(s) capable of transmitting light received from a light source optically coupled therewith. For example, in some embodiments, a visual indicator 120 may include one or more LED light sources optically coupled with a light ring or other lightguide structure. In accordance with an embodiment, such structure may comprise an optical material having the ability to optically couple light therein and to transmit/emit the wavelength(s) of interest (e.g., visible, ultraviolet, infrared, etc.) of that light. To that end, and in accordance with one or more embodiments, the structure may comprise a transparent and/or translucent material such as, but not necessarily limited to: a plastic or other polymer, such as poly(methyl methacrylate) (PMMA), polycarbonate, etc.; a transparent ceramic, glass, or other crystal, such as sapphire ($Al_2O_3$), yttrium aluminum garnet (YAG), etc.; and/or any combination thereof. In some instances, the structure may comprise a material which diffuses the light as it is emitted therefrom. Other suitable materials and optical coupling characteristics will depend on a given application and will be apparent in light of this disclosure.

Figure 2C:
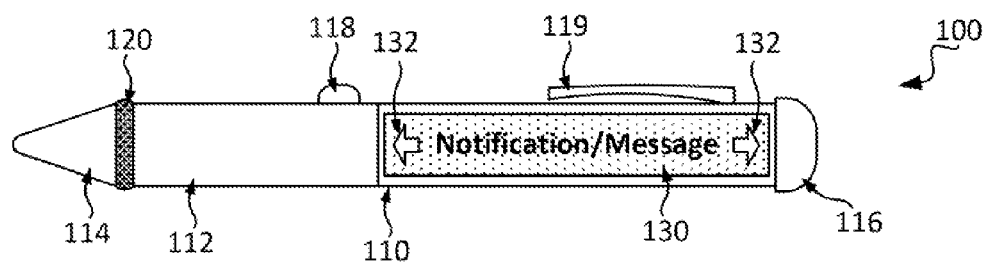
FIG. 2C illustrates a stylus configured in accordance with another embodiment of the present invention.

In accordance an embodiment, a given visual indicator 120 may be provided with any desired geometry. In some cases (e.g., such as can be seen in FIGS. 2A and 2C), a visual indicator 120 may be provided with a generally toroidal/donut-like shape which encircles the circumference of stylus 100. In some other cases, a given visual indicator 120 may be provided, for example, with a polygonal ring shape (e.g., a square ring, a hexagonal ring, an octagonal ring, etc.) which runs about the circumference of stylus 100. In some still other cases, a visual indicator 120 having a spiral, helical, or wave-like shape running about stylus 100 may be provided. In some other instances, a given visual indicator 120 may be configured as a patterned shape such as a star, a plurality of hemispherical dots, a brand emblem, etc. In some cases, a given visual indicator 120 may be configured in the shape of an icon which corresponds with an icon visible at the displayed user interface (UI) of the paired device 200. Numerous configurations will be apparent in light of this disclosure.

In some embodiments, a given visual indicator 120 may be configured with a geometry which facilitates observation thereof by a user from any angle (e.g., ~360° visibility). To that end, in some cases a given visual indicator 120 may be made to encircle or otherwise circumscribe stylus 100. It should be noted, however, that a given visual indicator 120 need not be configured to provide ~360° visibility, as in some other cases, a visual indicator 120 may be provided with a geometry, for example, which extends (in part or in whole) along the length of stylus 100 but which does not fully circumscribe stylus 100. In such cases, multiple visual indicators 120 can be spaced or otherwise deployed so as to eliminate blind spots with respect to user's view. As previously noted, numerous configurations will be apparent in light of this disclosure.

In accordance with an embodiment of the present invention, any of the characteristics of the light emitted by a given visual indicator 120 may be varied as desired for a given target application or end-use. For instance, in some cases, a given visual indicator 120 may be configured to emit light of one or multiple colors. Also, in some cases, a given visual indicator 120 may be capable of producing different patterns of light (e.g., pulsing, blinking). Furthermore, in some cases, a given visual indicator 120 may produce light of varying intensities (e.g., brightness, color temperature). In some instances, the color, pattern, and/or intensity of the light output of a given visual indicator 120 may be tunable according to user preferences or other schema, as desired for a given target application or end-use.

In accordance with one or more embodiments, a given color, pattern, and/or intensity of light emitted from a given visual indicator 120 may be assignable to or otherwise associated with a given type and/or context of alert, data, or other notification. For example, a given characteristic of the light emitted by a visual indicator 120 can be utilized: to denote different modes (e.g., switching stylus 100 between a pen input mode and a mouse input mode); to confirm different actions/functions (e.g., highlighting, creating a note, copying/pasting content, dictionary lookup, audio recording, reminder management, changing a setting of stylus 100 or device 200); to signify different levels of urgency/importance of a given notification/alert; and to indicate which program/application of device 200 has transmitted data to stylus 100. In some cases where the user has selected a tool-based function such as highlight or note taking tool, multiple color choices may be provided or otherwise available to the user, and in some such embodiments, a given visual indicator 120 may be configured to illuminate in a color which matches the color of the highlighter/note tool that is currently active. In a more general sense, and in accordance with one or more embodiments of the present invention, the numerous colors, patterns, intensities, and other characteristics of light produced by a given visual indicator 120 of stylus 100 may be associated with any of the various functions/capabilities of notification system 1000.

As previously discussed, a given visual indicator 120 may be configured, in some example cases, as an icon which corresponds with an icon displayed by the UI of device 200. In some cases, when a particular function/capability of the stylus 100 and/or of the paired device 200 is activated, an appropriate icon-like visual indicator 120 may be made to illuminate, in accordance with an embodiment. In some such instances, the icon-shaped visual indicator 120 may be configured to illuminate in one or more colors, which may be made to correspond with the related icon displayed by device 200. For example, an icon-like visual indicator 120 on stylus 100 may be configured to show a blue color to match the blue color of a paste-to-cloud function icon visible at the displayed UI of the paired device. Other suitable configurations, capabilities, and implementations of a given visual indicator 120 of stylus 100 will depend on a given application and will be apparent in light of this disclosure.

FIG. 2C illustrates a stylus 100 configured in accordance with another embodiment of the present invention. As can be seen, in some cases, stylus 100 optionally may include one or more displays 130. In some embodiments, stylus 100 may include a display 130, for example, in addition to the one or more visual indicators 120 previously discussed, while in some other embodiments, a display 130 may be implemented as an alternative to visual indicator(s) 120. It should be noted that while FIG. 2C generally depicts a stylus 100 including a single, continuous display 130, the claimed invention is not so limited, as in some other embodiments, multiple displays, partitioned/sectioned displays, discontinuous displays, etc., alternatively or additionally may be implemented. Numerous configurations will be apparent in light of this disclosure.

In accordance with an embodiment of the present invention, a given display 130 of stylus 100 may utilize any of a wide variety of display technologies. Some example display technologies which may be implemented include, but are not necessarily limited to: a light-emitting diode (LED) display; an electronic paper (e.g., electrophoretic/electronic ink or E-Ink) display; an organic light emitting diode (OLED) display (e.g., such as an active-matrix organic light emitting diode, or AMOLED, display); an electroluminescent display (ELD); a liquid crystal display (LCD); and/or any combination thereof. Other suitable display types/technologies for a given display 130, when optionally included, will depend on a given application and will be apparent in light of this disclosure.

In some cases, a given display 130 may be configured, for example, as a touch-sensitive display. To that end, and in accordance with one or more embodiments, such display 130 may utilize any of a wide range of touch-sensing techniques, such as, but not necessarily limited to: resistive touch-sensing; capacitive touch-sensing; surface acoustic wave (SAW) touch-sensing; infrared (IR) touch-sensing; optical imaging touch-sensing; and/or any combination thereof. Other suitable touch-sensing techniques will depend on a given application and will be apparent in light of this disclosure.

In any such case, a touch-sensitive display 130 may be activated, for example, by a user's finger or other suitable input tool/implement (e.g., touchscreen technology registers a tap, mini-swipe, etc.), as will be apparent in light of this disclosure. In some embodiments, a touch-sensitive display 130 may allow for providing to the user one or more virtual control features 132 (discussed below). In some instances, and in accordance with an embodiment, a user may utilize a touch-sensitive display 130 to provide input to stylus 100 and/or device 200. Other suitable touch-sensitive capabilities for a given display 130 will depend on a given application and will be apparent in light of this disclosure.

Furthermore, and in accordance with one or more embodiments, a given display 130 may be configured to display data/information in any of a wide range of formats. For instance, in some embodiments, a given display 130 may exhibit a segmented display format (e.g., seven-segment, nine-segment, fourteen-segment, sixteen-segment, etc.). In some other embodiments, a given display 130 may exhibit a dot-matrix display format (e.g., LED matrix, HD44780 display, etc.). In some still other embodiments, a given display 130 may exhibit an e-paper/e-ink display format. Suitable combinations of these and/or other display formats will be apparent in light of this disclosure. Also, a given display 130 may be configured to display information, for example, as a static image and/or as a dynamic image (e.g., scrolling, blinking, contrast/color inverting, etc.). Other suitable display formats and/or capabilities for a given display 130 will depend on a given application and will be apparent in light of this disclosure.

In accordance with one or more embodiments, a given display 130 may be configured to display text/characters of any font, size, color, character set, etc., as desired. Furthermore, and in accordance with one or more embodiments, a given display 130 may be configured to display text/characters against a background of any color, geometry, design, etc., as desired. In short, the text and/or background characteristics of a given display 130 can be customized to user preferences or other desired performance profiles. It should be noted, however, that the claimed invention is not limited to displaying only text/characters, as in some embodiments, a given display 130 may be configured to display images (e.g., color image, black and white/grayscale image, animated image, etc.) and/or videos. Also, in some cases, a given display 130 may be provided, for example, with an adjustable brightness, contrast, sharpness, saturation, etc. Other suitable configurations for a given display 130 of stylus 100 will depend on a given application and will be apparent in light of this disclosure.

As will be appreciated in light of this disclosure, and in accordance with one or more embodiments, a given display 130 may be configured to convey to a user by way of text, image, icon, video, etc., any of the numerous data types discussed herein (e.g., received message, currently active tool, color selection, scheduled reminder, etc.). In some instances, the text, image, icon, video, etc., displayed by a given display 130 may match that displayed, for example, via the UI of device 200, discussed below. Other suitable capabilities for a given display 130 of stylus 100 will depend on a given application and will be apparent in light of this disclosure.

Returning now to FIG. 2B, stylus 100 optionally may include on-board storage, in some embodiments. When included, such storage componentry may be utilized, for example, to store media, programs, applications, content, etc., on stylus 100 on a temporary or permanent basis. In some cases, stylus 100 may include memory which provides it with the ability, for example, to store received data, transmitted data, outbound data (e.g., outbound messages/notifications, instructions/commands, etc., not yet sent), user profile data (e.g., preferences/settings related to the stylus 100 and/or device 200), and/or any other data which it may be desirable to store (e.g., unique ID for communication purposes). The storage of stylus 100 may include volatile and/or non-volatile memory, as suitable for a given target application or end-use. In some cases, the storage of stylus 100 may be expandable by any desired size/increment, for example, using a suitable storage expansion technology (e.g., a microSD card, etc.). Other suitable configurations and/or capabilities of the optional storage of stylus 100 will depend on a given application and will be apparent in light of this disclosure.

In some embodiments, stylus 100 may include componentry which allows it to be powered, in part or in whole, by a standard or custom battery and/or integrated capacitive circuitry. When applicable, charging/recharging of the power source of stylus 100 may be provided using any suitable energy source, such as, but not necessarily limited to, electrical energy, solar energy, mechanical energy, etc. Other suitable power supply componentry and/or capabilities for stylus 100 will depend on a given application and will be apparent in light of this disclosure.

As will be appreciated in light of this disclosure, it may be desirable, in some instances, to provide stylus 100 with locating/tracking capabilities, for example, to aid in locating stylus 100 relative to an associated device 200 and/or vice versa. To that end, and in accordance with an embodiment, stylus 100 optionally may include locating/tracking componentry. In some cases, such locator/tracker may aid a user in locating a stylus 100 or a device 200 that has been misplaced, stolen, etc. In some cases, stylus 100 may be configured to signal to the user via a given visual indicator 120 when the user is heading in a correct direction and/or an incorrect direction to arrive at the location of an associated device 200. In some cases in which a display 130 optionally is included with stylus 100, directions (e.g., compass directions, step-by-step directions, a map, etc.) may be displayed on a given display 130 for a user to follow to arrive at the location of an associated device 200. In any such case, and in accordance with one or more embodiments, a user may be able to utilize stylus 100 to locate a paired device 200. Other suitable techniques and/or componentry for tracking/locating stylus 100 and an associated device 200 relative to one another will depend on a given application and will be apparent in light of this disclosure.

In some embodiments, stylus 100 optionally may include audio componentry, for example, to aid in recording and/or playback of audio data. In some cases, stylus 100 may include a speaker or other audio output device, for example, to play audio data received from a paired device 200. In some instances, stylus 100 may include a microphone or other audio input device, for example, to record audio data (e.g., from the user or other source near stylus 100). In some example cases, stylus 100 may be configured such that it can play for the user an audio reminder received from a paired device 200, and the user can input an audio command/instruction which then is relayed to and interpreted by device 200. Numerous configurations will be apparent in light of this disclosure.

In some embodiments, stylus 100 optionally may include one or more features designed to aid a user in use, manipulation, or operation thereof. For instance, in some cases, stylus 100 optionally may include one or more physical control features 118 (e.g., buttons, switches, knobs, pressure sensors, toggles, sliders) which a user may manually manipulate to aid in controlling/operating stylus 100 and/or an associated device 200. When included, a given physical control feature 118 may be positioned anywhere along stylus 100 (e.g., on body/barrel portion 110, on grip portion 112, on tip portion 114, on end portion 116). However, the claimed invention is not so limited. In some cases, a given display 130, when optionally included, may provide one or more virtual control features 132 (e.g., virtual buttons, switches) which a user may activate to aid in controlling/operating stylus 100 and/or device 200. Numerous configurations will be apparent in light of this disclosure.

When included, a given control feature 118/132 may be assigned to or otherwise associated with any of a wide range of functions/operations of stylus 100 and/or device 200, as desired for a given target application or end-use. For instance, in some embodiments, a given control feature 118/132 may be configured, for example: to snooze or dismiss an alert provided using a visual indicator 120 and/or optional display 130 of stylus 100; to make a selection from one or more options displayed by display 130; to switch or otherwise manage a currently active user preference profile (as discussed below); to enable/disable stylus 100 and/or device 200; or to perform a data refresh. Other suitable configurations and/or capabilities for a given control feature 118/132 will depend on a given application and will be apparent in light of this disclosure.

Also, in some embodiments, stylus 100 optionally may be provided with one or more physical features (e.g., contours, tapered profile, indents, recesses, ribs, bumps, etc.), for example, to aid a user in gripping or otherwise manipulating it. Such features, when included, may be located anywhere along stylus 100 (e.g., on body/barrel portion 110, on grip portion 112, on tip portion 114) and, in some instances, may comprise a material (e.g., such as rubber, foam, or other suitable material) which generally is conducive to the user's grip/manipulation of stylus 100. Furthermore, in some embodiments, stylus 100 optionally may be provided with a clip or other fastener 119, for example, to aid in attaching stylus 100 to any desirable surface/structure, such as a pocket, a holder, and/or an associated device 200. In some instances, stylus 100 may be configured to be physically received and retained by (e.g., inserted into) an associated device 200. Numerous suitable configurations will be apparent in light of this disclosure.

As previously noted, stylus 100 may be configured to interact, for example, with an electronic device 200 having a touchscreen display or other touch-sensitive surface. FIG. 3A is a front view of an example electronic device 200 having a touch-sensitive display 210 with which a stylus 100 may interact, in accordance with an embodiment of the present invention. As can be seen from FIG. 3A, device 200 may be generally configured, in some embodiments, as an eReader device or a tablet (e.g., such as the NOOK eReader and tablets by Barnes & Noble). In the depicted example case, device 200 includes a touch-sensitive display 210 housed within or otherwise protected by a housing 220 and having one or more buttons or other control features 222, 224, 226, etc. It should be noted, however, that the claimed invention is not limited in form or function to an eReader device like that of FIG. 3A. Other suitable example devices 200 include, but are not necessarily limited to, a laptop/notebook computer, a tablet, a mobile phone, a smartphone, a personal digital assistant (PDA), a portable media player (PMP), a navigation system/global positioning system (GPS), a gaming console, a handheld gaming device, a desktop computing system, a television, an electronic visual display, etc. In a more general sense, device 200 may be any portable/mobile or non-mobile electronic device including or otherwise configured as a touchscreen display or as a non-touch-sensitive display that can be used in conjunction with a touch-sensitive surface. Numerous suitable configurations will be apparent in light of this disclosure.

FIG. 3B is a block diagram representing an example electronic device 200, in accordance with an embodiment of the present invention. As can be seen, this example device 200 includes a processor, memory (e.g., RAM and/or ROM for processor workspace and storage), additional storage/memory (e.g., for content), a communications module, a touch-sensitive display 210, a power supply, an audio module, and a locator/tracker module. In some cases, a communications bus/interconnect may be provided, for instance, to allow for communication between any or all modules of device 200. As will be appreciated in light of this disclosure, additional and/or different componentry and functionality may be implemented with device 200 (e.g., battery, co-processor, speaker, antenna, etc.), as desired for a given target application or end-use.

As can further be seen, device 200 may include one or more processors configured, for example, to process data that is outbound for stylus 100 and/or to process data that is inbound for device 200 from a paired stylus 100, a user, or any other suitable data source, as will be apparent in light of this disclosure. In some cases, the processor circuitry of device 200 may be configured to aid in processing electrical signals received from interaction with stylus 100 (e.g., direct contact, proximate contact, etc.). In some instances, one or more co-processors and/or controllers may be included to assist a given processor with controlling device 200. In some cases, a given processor of device 200 may be configured to receive and interpret signals from any of the various control features 222, 224, 226, etc., of device 200. As will be appreciated in light of this disclosure, any of a wide range of suitable processors can be implemented (e.g., such as the 800 MHz Texas Instruments OMAP3621 applications platform), as desired for a given target application or end-use. Other suitable configurations and/or capabilities of the one or more processors of device 200 will depend on a given application and will be apparent in light of this disclosure.

The memory can be of any suitable type (e.g., RAM and/or ROM, or other suitable memory) and of any suitable size, and in some cases may be implemented with volatile memory, non-volatile memory, or a combination thereof. Other suitable configurations and/or capabilities of the memory of device 200 will depend on a given application and will be apparent in light of this disclosure. In this example embodiment, the memory includes a number of modules stored therein that can be accessed and executed by the processor (and/or a co-processor). The modules include an operating system (OS), a user interface (UI), and a power conservation routine (Power). The modules can be implemented, for example, in any suitable programming language (e.g., C, C++, objective C, JavaScript, custom or proprietary instruction sets, etc.), and encoded on a machine-readable medium that, when executed by the processor (and/or co-processors), carries out the functionality of the device including a UI having a hover-over stylus action function as described herein. The computer-readable medium may be, for example, a hard drive, compact disk, memory stick, server, or any suitable non-transitory computer/computing device memory that includes executable instructions, or a plurality or combination of such memories. Other embodiments can be implemented, for instance, with gate-level logic or an application-specific integrated circuit (ASIC) or chip set or other such purpose-built logic, or a microcontroller having input/output capability (e.g., inputs for receiving user inputs and outputs for directing other components) and a number of embedded routines for carrying out the device functionality. In short, the functional modules can be implemented in hardware, software, firmware, or a combination thereof.

In some embodiments, device 200 may include one or more storage components. When included, such storage componentry may be utilized, for example, to store media, programs, applications, content, etc., on device 200 on a temporary or permanent basis. In some cases, device 200 may include memory which provides it with the ability to store received data, transmitted data, outbound data (e.g., outbound messages/notifications not yet sent), user profile data (e.g., preferences/settings related to the stylus 100 and/or device 200), and/or any other data which it may be desirable to store (e.g., IDs for purposes of communication with the stylus via a network). The storage of device 200 may include volatile and/or non-volatile memory, as suitable for a given target application or end-use. In some cases, the storage of device 200 may be expandable by any desired size/increment, for example, using a suitable storage expansion technology (e.g., a microSD card, etc.). Other suitable configurations and/or capabilities of the storage of device 200 will depend on a given application and will be apparent in light of this disclosure.

In some cases, device 200 may include an operating system (OS), for example, to aid in processing received electrical signals upon interaction (e.g., direct contact, proximate contact, etc.) with stylus 100. The OS module can be implemented with any suitable OS, mobile or otherwise (e.g., Android OS from Google, Inc.; iOS from Apple, Inc.; Windows Phone OS from Microsoft Corp.; etc.), as will be apparent in light of this disclosure. Furthermore, in some cases, device 200 may include a power management (Power) module. As will be appreciated in light of this disclosure, such power module may be configured as typically done, in some cases. In some instances, the power module may aid in automatically transitioning device 200, for example, to a low-power consumption mode or sleep mode after a given period of non-use. Also, a wake-up from such sleep/low-power mode can be achieved, for example, by a physical button press, a touchscreen swipe, and/or other user action. Furthermore, device 200 includes a user interface (UI) module configured, for example, to provide a UI based on touch-sensitive display 210, as discussed below. In addition, the UI can be programmed or otherwise configured to carry out a stylus-based notification scheme as variously described herein, such as with reference to the screen shots of FIGS. 3C-3D and/or the methodology demonstrated in FIGS. 5A and 5B, which will be discussed in turn.

In some embodiments, device 200 may include communications componentry to aid in communicatively coupling device 200 and a stylus 100, as previously noted. In some instances, the communications module of device 200 can be configured, for example, to execute any suitable protocol which allows for connection of a stylus 100 with a paired device 200 such that data can be wirelessly communicated there between (e.g., in one direction or in both directions). Also, and in accordance with one or more embodiments, device 200 may include, for example, receiver componentry, transmitter componentry, or transceiver componentry to provide one-way and/or two-way communication with stylus 100, as desired for a given target application or end-use. Other suitable componentry (e.g., chips or chip sets) which provide the desired wireless communication between a stylus 100 and a paired device 200 (including any custom or proprietary protocols) will depend on a given application and will be apparent in light of this disclosure.

As will be appreciated in light of this disclosure, and in accordance with one or more embodiments, wireless communication between device 200 and a paired stylus 100 may be provided using any of the various suitable wireless communication methods discussed above with reference to stylus 100 (e.g., RF, Wi-Fi®, Bluetooth®, NFC, WLAN, IR, cellular data service, satellite internet access, or a combination thereof). As will be further appreciated, device 200 may be capable of utilizing multiple methods of wireless communication, with optional overlapping in function and/or operation, as desired for a given target application or end-use. As will yet further be appreciated, much like with stylus 100, the suitability of a given wireless communication technique may depend, at least in part, on the relative distance between the stylus 100 and the associated device 200. Numerous suitable configurations will be apparent in light of this disclosure.

As previously noted, and in accordance with one or more embodiments, device 200 may include or otherwise be operatively coupled with one or more touch-sensitive displays 210. It should be noted, however, that the claimed invention is not so limited, as in some other embodiments, device 200 may include or otherwise be operatively coupled with a non-touch-sensitive display and have a touch-sensitive surface implemented therewith (e.g., a track pad; a touch-sensitive housing 220). In any such cases, device 200 generally may be capable of translating direct and/or proximate contact of touch-sensitive display 210 by stylus 100 into an electronic signal that can be manipulated or otherwise used to trigger a UI action, such as any of those discussed herein.

In some cases, stylus 100 may be capable of providing an input to a touch-sensitive device 200 either by direct contact or by proximate contact with a given touch-sensitive surface thereof (e.g., a touchscreen display 210). To that end, and in accordance with one or more embodiments, touch-sensitive display 210 generally may be configured to detect or otherwise sense direct and/or proximate contact from stylus 100 at a given location of display 210. In some such embodiments, display 210 also may be configured to translate that contact into an electrical signal which can be processed by device 200. Device 200 may detect/sense contact of display 210 by stylus 100 using any of a wide range of touch-sensing techniques, such as: capacitive touch-sensing; resistive touch-sensing; surface acoustic wave (SAW) touch-sensing; infrared (IR) touch-sensing; optical imaging touch-sensing; and/or any combination thereof. Other suitable techniques for detecting/sensing contact of display 210 by stylus 100 will depend on a given application and will be apparent in light of this disclosure.

In some cases, device 200 may be configured to display or otherwise provide to the user a touch-sensitive user interface (UI) (e.g., on a touch-sensitive display 210). To that end, and in accordance with one or more embodiments, touchscreen display 210 may be configured to display various UI menus, sub-menus, features, icons, and/or buttons which a user may utilize as UI touchscreen controls. As will be appreciated in light of this disclosure, such UI touchscreen controls can be programmed or otherwise configured using any suitable conventional and/or custom techniques, as desired for a given target application or end-use. In some instances, a given UI control may be assigned or otherwise associated with a given control feature/button 222, 224, 226, etc. Other suitable configurations and/or capabilities of a given UI of device 200 will depend on a given application and will be apparent in light of this disclosure.

As part of the UI, touchscreen display 210 may be configured, in some cases, to display or otherwise provide the user with one or more taskbars 212. A given taskbar 212 may include, for instance, a quick navigation menu (e.g., such as is enclosed by the dashed box in FIG. 3A) which may provide the user with ready access to any of a number of features/capabilities of device 200. For example, in some embodiments, a taskbar 212 may provide a quick navigation menu which includes one or more touch-sensitive virtual buttons which, when activated by the user, cause device 200 to perform any of a wide variety of tasks/operations. For instance, in the example case depicted by FIG. 3A, taskbar 212 includes a Home button, a Library button, a Shop button, a Search button, a Light button, and a Settings button, each of which may be associated with a corresponding function or capability, as will be appreciated in light of this disclosure. The claimed invention is not so limited, however, as additional and/or different buttons and capabilities for a given quick navigation menu of taskbar 212 may be provided, as desired for a given target application or end-use.

In some cases, touchscreen display 210 may be configured to display or otherwise provide the user with one or more status bars 214 as part of the UI. A given status bar 214 may be configured to convey to the user information, for example, pertaining to the operation, status, and/or performance of device 200 and/or a paired stylus 100. In some cases, such information may be conveyed to the user by display of one or more icons which are indicative of or otherwise associated with any of a wide range of settings/functions of device 200 and/or stylus 100. For instance, in the example of FIG. 3A, status bar 214 includes a Nightlight icon which indicates the current state of the nightlight function of display 210, a Wireless Network Signal icon which indicates the state of the wireless connection of device 200 with stylus 100 and/or other wireless signal source, a Battery Life icon which indicates the remaining power available for device 200 and/or stylus 100, a Clock icon which indicates the current time, and a Book icon which indicates whether a book (or other media file/stream) is currently active on device 200. As will be appreciated in light of this disclosure, however, the claimed invention is not so limited, and additional and/or different capabilities of device 200 and/or stylus 100 (and thus additional and/or different corresponding icons for a given status bar 214) will depend on a given application and will be apparent in light of this disclosure.

In some embodiments, device 200 may be capable of displaying on display 210 one or more icons corresponding to any of the various functions/capabilities of device 200. Such an icon may exhibit, for example, a particular shape and/or a particular color. As previously noted, in some cases, a given visual indicator 120 of stylus 100 may be provided with a shape that is similar to or the same as a given icon displayed by device 200. In some instances, a given visual indicator 120 of stylus 100 may be configured to illuminate the same color as a given icon displayed by device 200 (e.g., a visual indicator 120 of stylus 100 illuminates blue to match the blue color of a paste-to-cloud function icon displayed by the UI of the paired device 200). In some embodiments, an icon corresponding to activation, use, or changing of a given tool function (e.g., highlight, note, copy/paste, dictionary lookup, audio recording, etc.) may appear on device 200 (and/or on a display 130, if optionally implemented) to aid the user in confirming that the desired tool has been selected or the desired action has been performed.

As can further be seen from FIG. 3A, touch-sensitive display 210 of device 200 may be housed within or otherwise protected by a housing 220, in some embodiments. Housing 220 can be provided with any desired geometry, dimensions, material(s), etc., as suitable for a given target application or end-use of device 200. Furthermore, device 200 may include one or more buttons or other control features 222, 224, 226, etc., in accordance with one or more embodiments. A given control feature 222, 224, 226, etc., may be provided, for instance, as a physical or virtual button, switch, toggle, slide, or other suitable control, as will be apparent in light of this disclosure. Also, a user may activate a given control feature 222, 224, 226, etc., for example, by touching, pressing, holding, etc., such button. In some instances, a given control feature 222, 224, 226, etc., may be configured such that different responses result when different methods/patterns of activating the control feature are used (e.g., pressing and releasing a button provides a first response, while pressing and holding that button provides a second, different response). In some example cases, a given control feature 222, 224, 226, etc., may be located on or otherwise integrated with housing 220. However, the claimed invention is not so limited, as in some other example cases, a given control feature 222, 224, 226, etc., may be presented or otherwise provided by display 210. In some cases, activation of a given control feature 222, 224, 226, etc., may cause a corresponding touch-based UI control feature to be displayed on display 210, for example, to confirm a given user input (e.g., to confirm a given action/request). Other suitable configurations, locations, and/or capabilities for a given control feature 222, 224, 226, etc., will depend on a given application and will be apparent in light of this disclosure.

In general, and in accordance with one or more embodiments, a given control feature 222, 224, 226, etc., may be included to aid a user in controlling, operating, or otherwise utilizing device 200 and/or stylus 100. For instance, control feature 222 may be configured, for example, as a power button associated with changing the power state of device 200 (e.g., powering up, powering down, putting into a sleep/idle state, etc.). In some embodiments, control feature 224 may be configured, for example, as a home button associated with any of a number of functions/capabilities of device 200 (e.g., returning to a home screen, ceasing an active application/function currently being executed on device 200, closing a menu/sub-menu that is currently open and displayed on display 210, enabling/disabling a power conservation routine for device 200, etc.). In some embodiments, control feature(s) 226 may be configured, for example, as general-purpose buttons associated with any of a wide variety of functions/capabilities of device 200 (e.g., cycling through content displayed by display 210, paging forward/backward through displayed content/options, etc.). It should be noted, however, that the claimed invention is not so limited to these examples, and in a more general sense, a given control feature 222, 224, 226, etc., may be associated with any standard and/or user-defined function, capability, or application of device 200, as desired.

Figure 3C:
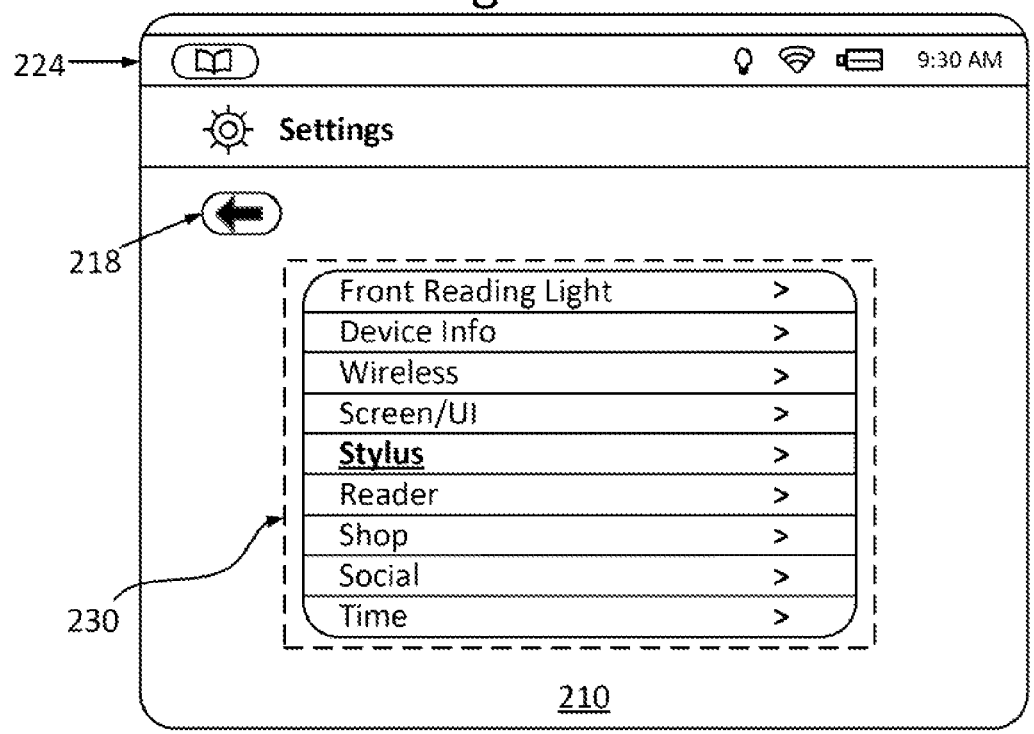
FIG. 3C illustrates a partial front view of the device of FIG. 3A after using the touchscreen UI provided by the touch-sensitive display to access a settings menu, in accordance with an embodiment of the present invention.
Figure 3D:
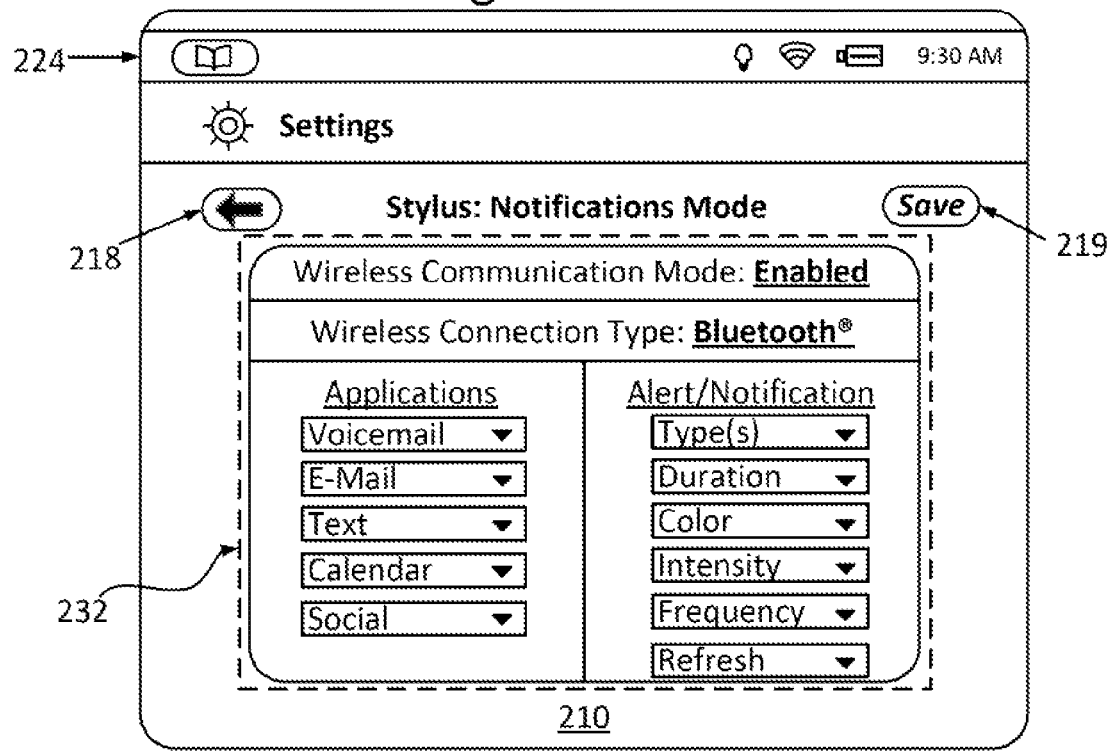
FIG. 3D illustrates a partial front view of the device of FIG. 3C after using the UI provided by the touch-sensitive display to access a stylus settings sub-menu, in accordance with an embodiment of the present invention.

FIG. 3C illustrates a partial front view of the device 200 of FIG. 3A after using the touchscreen UI provided by touch-sensitive display 210 to access a settings menu 230, in accordance with an embodiment of the present invention. As can be seen, a user may select from any of a number of options provided by settings menu 230, including an option directed to settings corresponding to stylus 100, for example. FIG. 3D illustrates a partial front view of the device 200 of FIG. 3C after using the UI provided by touch-sensitive display 210 to access a stylus settings sub-menu 232, in accordance with an embodiment of the present invention. In response to selecting the stylus settings option provided by settings menu 230, display 210 may display a stylus settings sub-menu 232. As can be seen, and in accordance with an embodiment, the user can configure a number of settings/functions with respect to the stylus notifications mode of a paired stylus 100. In the depicted example case, some available applications are provided along with corresponding drop-down menus, as well as alert/notification settings with corresponding drop-down menus. In some other embodiments, check boxes, radio buttons, etc., additionally or alternatively may be implemented as part of the UI for options displayed in sub-menu 232. Numerous suitable configurations will be apparent in light of this disclosure.

As can further be seen from FIG. 3D, stylus settings sub-menu 232 may include a UI option which, when selected or otherwise activated by the user, enables/disables wireless communication (e.g., one-way or two-way) between device 200 and stylus 100. It should be noted, however, that the claimed invention is not so limited, as some other embodiments may have the stylus notifications mode always enabled or enabled by use of a control feature (e.g., button/switch) on stylus 100 and/or device 200, for example. Also, stylus settings sub-menu 232 may include a UI option corresponding to the type of wireless connection between device 200 and a paired stylus 100 (e.g., Wi-Fi®, Bluetooth®, IR, cellular, etc.). Furthermore, in some embodiments, stylus settings sub-menu 232 may include one or more UI options which, when selected or otherwise activated by the user, specify various characteristics (e.g., type, duration, color, intensity, frequency, refresh, etc.) of the alert/notification to be received by stylus 100. It should be noted, however, that the claimed invention is not so limited to the example menu scheme discussed in the context of FIGS. 3C-3D, as any number of menu schemes and/or nested hierarchies of UI features and options may be displayed by display 210 of device 200, in accordance with one or more embodiments of the present invention. In other embodiments, the stylus notification mode can be hard-coded such that no configuration sub-menus are needed or otherwise provided (e.g., a user could be given an online help file or other literature to explain mode functionality). The degree of hard-coding versus user-configurability can vary from one embodiment to the next, and the claimed invention is not intended to be limited to any particular configuration scheme of any kind, as will be appreciated.

In some instances, and in accordance with one or more embodiments, a user may be able to assign (e.g., such as by menu 230/sub-menu 232 or other UI menu) a given meaning/significance to a particular characteristic (e.g., color, pattern, intensity, etc.) of the light emitted by a given visual indicator 120 of stylus 100. For example, one color of light may be assigned to indicate an urgent/important notification or alert, while another color of light may be assigned to indicate a message from a particular social media service, while yet another color of light may be assigned to indicate communication has been received from a specific individual or group, while still another color of light may be assigned to a specific application/software. Numerous configurations will be apparent in light of this disclosure.

As can further be seen from FIG. 3D, in some cases, the UI provided by display 210 optionally may display additional UI features, such as a back button 218 (e.g., to allow a user to go back to a previous menu/sub-menu). However, in some instances, returning to a previous menu/sub-menu additionally or alternatively may be achieved using one or more of the control features 222, 224, 226, etc., previously discussed. Also, in some cases, a save button 219 (e.g., to save user selections/inputs) may be provided, and in some such instances, saving additionally or alternatively may be achieved using one or more of the control features 222, 224, 226, etc. In some still other cases, saving of user selections/inputs may be done automatically without further confirmation by a user. Other suitable optional UI features will depend on a given application and will be apparent in light of this disclosure.

In some embodiments, device 200 may include componentry which allows it to be powered, in part or in whole, by a standard or custom battery and/or integrated capacitive circuitry. When applicable, charging/recharging of the power source of device 200 may be provided using any suitable energy source (e.g., electrical energy, solar energy, mechanical energy, etc.), as desired for a given target application or end-use. Other suitable power supply componentry and/or capabilities for device 200 will depend on a given application and will be apparent in light of this disclosure.

As previously noted, it may be desirable, in some instances, to provide the user with the ability to locate device 200 relative to an associated stylus 100 and/or vice versa. To that end, and in accordance with an embodiment, device 200 optionally may include locating/tracking componentry. As will be appreciated in light of this disclosure, such locator/tracker componentry may function in much the same way as discussed above with reference to stylus 100, in some embodiments. Numerous suitable configurations will be apparent in light of this disclosure.

In some embodiments, device 200 may include audio componentry, for example, to aid in recording and/or playback of audio data. In some cases, device 200 may include a speaker or other audio output device, for example, to play audio data received from a paired stylus 100 or other data source. In some instances, device 200 may include a microphone or other audio input device, for example, to record audio data (e.g., from the user or other source near device 200). Numerous configurations will be apparent in light of this disclosure.

Communication

As previously noted, and in accordance with one or more embodiments, a stylus 100 configured as described herein may be capable of receiving data from an associated device 200. The device 200 may be local but unavailable to the user (e.g., in a nearby locker or book-bag) or remote to the user (e.g., at home or in car). In some cases, and in accordance with an embodiment, such received data may be presented in the form of an alert or other notification to the user, which may vary based on the target application or end-use of system 1000. In some such cases, and in accordance with one or more embodiments, such inbound alert/notification may be presented to the user, for example, using the one or more visual indicators 120 (e.g., LED ring and/or the one or more optional displays) of stylus 100.

In some cases, stylus 100 may receive from an associated device 200 a notification, for example, pertaining to the current time/date, the news/current events, weather, sports, stock reports, etc. In some other cases, a notification pertaining to scheduled events and/or reminders managed or otherwise monitored by device 200 (e.g., an upcoming meeting, an exam, a class time, an alarm, a deadline, etc.) may be received by stylus 100 from device 200. In some other cases, stylus 100 may receive from an associated device 200 a notification, for example, pertaining to a social media notification, a text message, an instant message (IM), a phone call, a voicemail, an e-mail, etc., received by device 200. In some instances, device 200 may deliver to stylus 100 a notification pertaining to a warning, alert, or other emergency notice (e.g., regarding severe weather, emergency conditions/events, an evacuation, etc.). In some other instances, stylus 100 may receive from an associated device 200 a notification, for example, pertaining to the location of stylus 100 relative to device 200 (e.g., signifying whether a user is heading in a correct or an incorrect direction to arrive at the location of a paired device 200, such as by compass directions, step-by-step directions, a map, etc.). In some other instances, stylus 100 may receive from an associated device 200 a notification, for example, pertaining to the power conditions of the stylus 100 and/or of the device 200 (e.g., remaining power level, remaining usage time, remaining charging time, etc.). Other types of data or information which may be presented by stylus 100 to the user as an alert or notification using a given visual indicator 120 (e.g., LED ring and/or a given display 130, if provided) even if device 200 is out of reach or otherwise inaccessible to such user will be apparent in light of this disclosure.

It should be noted that a stylus 100 configured as described herein is not limited only to receiving data from an associated device 200. For instance, in some embodiments, a given stylus 100 additionally (or alternatively) may be configured to transmit data to an associated device 200 even if the user does not have immediate access to such device 200. In some cases, and in accordance with an embodiment, such transmitted data may include a command/instruction or other input to device 200, the contents of which may vary based on the target application or end-use of system 1000. In some instances, the data to be transmitted from stylus 100 to device 200 may be entered and/or displayed via an optionally included display 130. Also, in some instances, confirmation that an outbound command/instruction or other user input has been sent by stylus 100 to device 200 may be presented to the user, for example, by a given visual indicator 120 and/or optional display 130 of stylus 100.

In some cases, stylus 100 may transmit to an associated device 200 data/information, for example, pertaining to an acknowledgment, a postponement, a dismissal, a change, etc., to a scheduled event/reminder managed or otherwise monitored by device 200. In some other cases, stylus 100 may transmit to an associated device 200 data/information, for example, pertaining to an acknowledgment, a review, a reply, a forwarding, a deletion, etc., of a social media notification, text message, phone call, voicemail, e-mail, or other message, received by device 200. In some still other cases, stylus 100 may transmit to an associated device 200 data/information, for example, pertaining to an instruction to lock access to and/or or wipe data from device 200 (discussed below). In some instances, stylus 100 may transmit to an associated device 200 data/information, for example, pertaining to an instruction to enable/disable device 200 (e.g., cause device 200 to turn off, turn on, sleep/hibernate, etc.). In some other instances, stylus 100 may transmit to an associated device 200 data/information, for example, pertaining to a change/update to or selection of user preferences/settings for stylus 100 and/or device 200. In some other instances, stylus 100 may transmit to an associated device 200 data/information, for example, pertaining to an instruction to perform a data refresh (e.g., received data and/or transmitted data). Other types of data/information which may be transmitted by stylus 100 and which a user may desire to input even if device 200 is out of reach or otherwise inaccessible will be apparent in light of this disclosure. As previously noted, confirmation that such outbound data/information has been sent by stylus 100 may be presented to the user, for example, by a given visual indicator 120 (e.g., such as an LED ring and/or a given display 130) of stylus 100, in some embodiments.

As previously discussed, stylus 100 may include on-board storage componentry which permits stylus 100 to store received and/or outbound data temporarily or otherwise. In some instances, stylus 100 may be configured to allow a user to review stored data (e.g., received and/or outbound notifications/messages, inputs/commands, etc.), for example, upon user input/command. To that end, stylus 100 may include, in some embodiments, one or more control features 118/132 (discussed above) which are assigned the ability to cycle through and/or make selections from stored data. A given visual indicator 120 (and/or optional display 130) of stylus 100 may be configured to provide the user with visual feedback that a selection has been made, or an action has been performed, or a mode has been switched (e.g., such as when switching between pen mode and mouse mode), in accordance with one or more embodiments of the present invention. Other suitable techniques for reviewing and selecting from data received, transmitted, or otherwise stored on stylus 100 using a given visual indicator 120 will depend on a given application and will be apparent in light of this disclosure.

In accordance with one or more embodiments, stylus 100 may be configured to perform a data refresh of received and/or transmitted data as frequently as desired for a given target application or end-use. For example, in some cases, stylus 100 may perform a data refresh on a push-style basis; that is, active transfer of data from device 200 to stylus 100 may occur when such data arrives or is otherwise made present at device 200. In some other cases, stylus 100 may perform a data refresh upon user instruction (e.g., a user may input a command to the stylus 100 which causes it to perform a data refresh). In some still other cases, stylus 100 periodically may perform a data refresh (e.g., based on a user-defined schedule, a given time interval, etc.). In any such case, a change in the refreshed data, if any, may be conveyed to the user via a given visual indicator 120. Other suitable data refresh capabilities of stylus 100 will depend on a given application and will be apparent in light of this disclosure.

As previously noted, in some embodiments, stylus 100 may include a plurality of visual indicators 120. For example, consider FIG. 4A, which illustrates a stylus 100 having a plurality of visual indicators 120a, 120b, and 120c, in accordance with an embodiment of the present invention. As will be appreciated in light of this disclosure, while the depicted example stylus 100 of FIG. 4A includes three visual indicators 120a, 120b, and 120c, the claimed invention is not so limited. In some other embodiments, a stylus 100 configured as described herein may include fewer (e.g., two or fewer) or more (e.g., four or more) visual indicators 120, as desired for a given target application or end-use. As will be further appreciated, the claimed invention is not intended to be limited to only the example depicted locations for the various visual indicators 120a, 120b, 120c, etc., as in a more general sense, a visual indicator 120 may be positioned in any desired location along the length of stylus 100, in accordance with an embodiment. Also, in some embodiments, a plurality of visual indicators 120a, 120b, 120c, etc., may be implemented in conjunction with one or more displays 130, as previously discussed. Numerous suitable configurations will be apparent in light of this disclosure.

In some cases in which a plurality of visual indicators 120 are provided, any two thereof may be distinct from one another, for example, in appearance, alert type, and/or functionality. For instance, a first visual indicator 120a may emit light of a first color, pattern, intensity, etc., while a second visual indicator 120b may emit light of a second color, pattern, intensity, etc. However, the claimed invention is not so limited, as in some other instances, any two visual indicators 120 (when two or more are implemented) may be configured to overlap in appearance, alert type, and/or functionality, as desired for a given target application or end-use.

In accordance with an embodiment, a given color, pattern, intensity, or other characteristic of the light emitted by a given visual indicator 120 may be assigned to or otherwise associated with a given notification, alert, feedback, condition, or other event of interest. For instance, in one example case, a first visual indicator 120a may strobe a green light to signal to the user that a homework assignment is due soon, while a second visual indicator 120b may blink a blue light to signal to the user that the stylus 100 has a good remaining power level, while a third visual indicator 120c may emit a steady red light to signal to the user that an urgent message has been received by a paired device 200. As will be appreciated in light of this disclosure, the claimed invention is not intended to be limited to this example case, and any number of light characteristics and events of interest may be associated as desired for a given target application or end-use, in accordance with an embodiment.

In addition to alerting or otherwise notifying the user via one or more visual indicators 120, stylus 100 also may be configured, in some embodiments, to use one or more additional indicator/feedback features. For instance, consider FIGS. 4B-4C, which illustrate several styluses 100 including various indicator/feedback features, in accordance with some example embodiments of the present invention. As can be seen from FIG. 4B, stylus 100 optionally may be configured to indicate receipt and/or transmission of data via haptic feedback. To that end, stylus 100 may include haptic feedback/indicator componentry (e.g., an actuator, such as a vibratory motor, and an associated controller) configured to activate and produce various patterns, intensities, etc., of vibration or other haptic feedback. In some cases, the haptic indicator/feedback componentry may be included within stylus 100 (e.g., in the body/barrel portion 110, in the grip portion 112, etc.). In some instances, a visual indicator 120 (e.g., LED ring and/or display 130, when optionally included) and the haptic feedback componentry may be configured to activate simultaneously to provide the user with multiple forms of alert/notification. Other suitable configurations and/or componentry for providing stylus 100 with haptic indicator/feedback capabilities will depend on a given application and will be apparent in light of this disclosure.

Figure 4A:
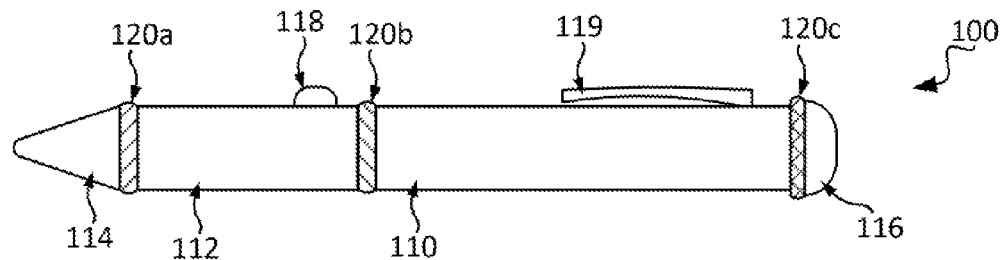
FIG. 4A illustrates a stylus having a plurality of visual indicators, in accordance with an embodiment of the present invention.
Figure 4B:
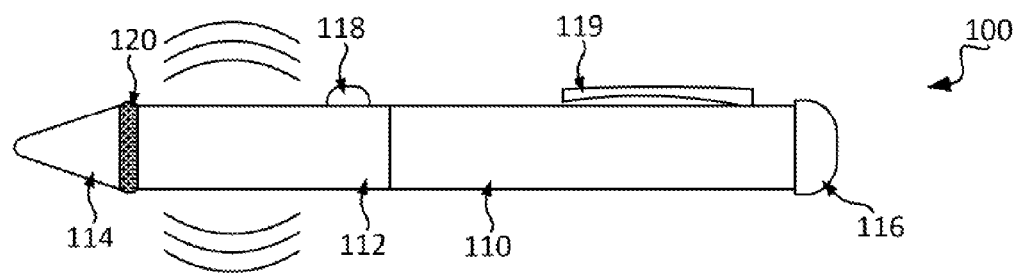
FIG. 4B illustrates a stylus having a visual indicator and configured for haptic feedback, in accordance with an embodiment of the present invention.
Figure 4C:
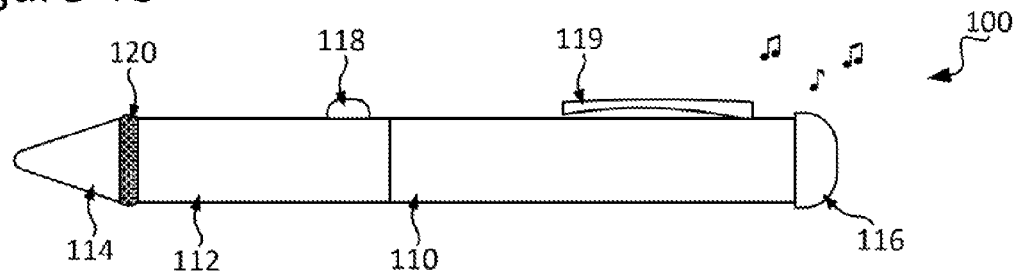
FIG. 4C illustrates a stylus having a visual indicator and configured for aural feedback, in accordance with an embodiment of the present invention.

As can be seen from FIG. 4C, stylus 100 optionally may be configured to indicate receipt and/or transmission of data via aural feedback. To that end, stylus 100 may include aural feedback/indicator componentry (e.g., a speaker and an associated controller) configured to emit sound upon receipt and/or transmission of data. When included, the aural feedback/indicator componentry may be configured, for example, to emit various patterns and/or intensities of sounds such as chimes, music, alarms, recorded vocals, etc. In some cases, the aural feedback/indicator componentry may be included within stylus 100 (e.g., in the body/barrel portion 110, in the grip portion 112, in the end portion 116, etc.). In some instances, a visual indicator 120 (e.g., LED ring, LED at top of stylus, and/or display 130) and the aural feedback componentry may be configured to activate simultaneously to provide the user with multiple forms of alert/notification. Other suitable configurations and/or componentry for providing stylus 100 with aural indicator/feedback capabilities will depend on a given application and will be apparent in light of this disclosure.

In any of the above-mentioned cases, stylus 100 also may be configured, for example, to indicate or otherwise provide an alert/notification to the user that a given piece of received and/or transmitted data is particularly important or urgent. In some cases, this may be done by altering the color, pattern, intensity, etc., of light emitted by a given visual indicator 120. In some other cases, a given display 130 (when optionally included) may be made to display text, an image, a video, or other visual cue regarding the importance/urgency. In some still other cases, the type, pattern, intensity, or other characteristic of vibration, sound, etc., may be altered to indicate importance/urgency. As previously noted, in some cases, stylus 100 may be configured to employ multiple types of indicators/feedback simultaneously (e.g., stylus 100 may vibrate while a given visual indicator 120 blinks or shows a particular color, etc.). Numerous configurations will be apparent in light of this disclosure.

Methodology

Figure 5A:
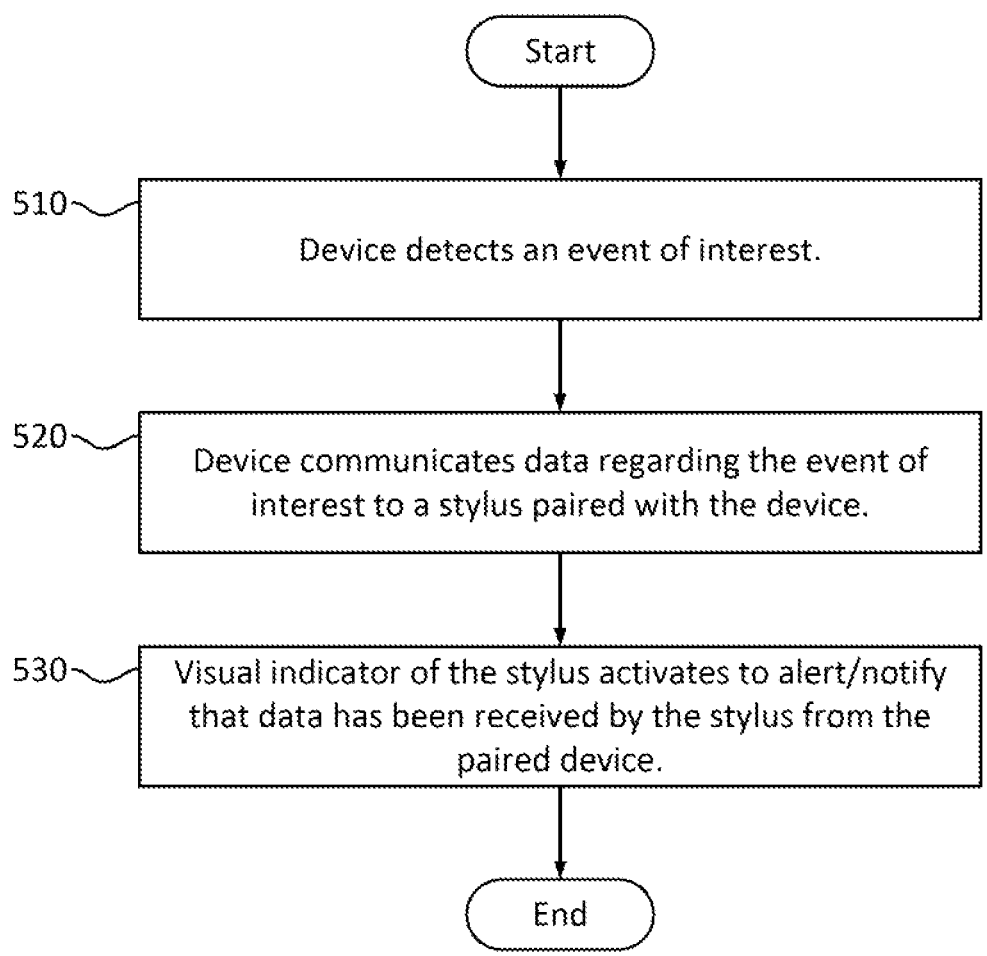
FIG. 5A is a flow diagram illustrating an example method of communicating a notification from an electronic device to a paired stylus, in accordance with an embodiment of the present invention.

FIG. 5A is a flow diagram illustrating an example method of communicating an alert/notification from an electronic device 200 to a paired stylus 100, in accordance with an embodiment of the present invention. The process may begin, as in block 510, with electronic device 200 detecting an event of interest, such as a phone call, social media message, schedule reminder, or any of the numerous other events about which it may be desirable to alert/notify the user via stylus 100, as discussed above. The process may continue, as in block 520, with the electronic device 200 communicating data regarding the event of interest to the stylus 100 paired with such device 200. As previously discussed, communication between stylus 100 and device 200 may use any of a wide variety of wireless (e.g., Wi-Fi®, Bluetooth®, cellular data service, etc.) and/or wired (e.g., USB cable, etc.) communications techniques, as desired for a given target application or end-use. Thereafter, the process may continue, as in block 530, with a visual indicator 120 of stylus 100 activating to alert or otherwise notify the user of such stylus 100 that an event of interest has been received, detected, or otherwise noted by device 200. As previously discussed, and in accordance with one or more embodiments, one or more displays 130, a plurality of visual indicators 120a, 120b, 120c, etc., and/or additional feedback mechanisms (e.g., haptic, aural, etc.) may be implemented, as desired for a given target application or end-use.

Figure 5B:
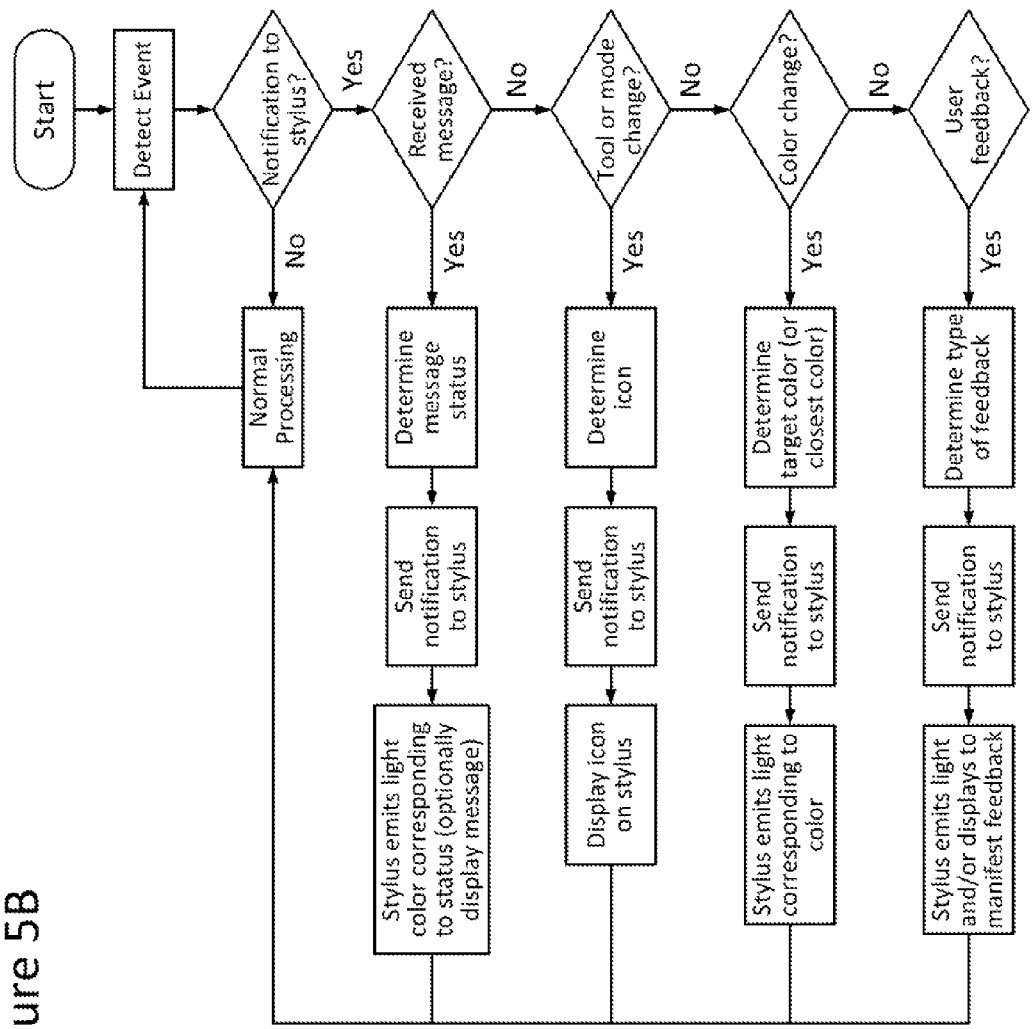
FIG. 5B is a flow diagram illustrating an example method of communicating a notification from an electronic device to a paired stylus, in accordance with another embodiment of the present invention.

FIG. 5B is a flow diagram illustrating an example method of communicating an alert/notification from an electronic device 200 to a paired stylus 100, in accordance with an embodiment of the present invention. The process may begin with detecting an event of interest and determining whether a notification is to be sent from device 200 to stylus 100. If no notification is to be sent, then device 200 may continue with normal processing. If instead a notification is to be sent to stylus 100, then the process flow may continue as described below.

In instances in which a message has been received by device 200, a determination as to the message status may be made by device 200, and the notification may be sent to stylus 100. Stylus 100 may be caused to emit one or more colors of light corresponding to the status of the notification. In some instances in which a display 130 is optionally implemented with stylus 100, a message may be displayed regarding the notification. Thereafter, normal processing by device 200 may be resumed.

If instead a tool or mode has been changed, the process flow may continue with determining which icon corresponds with the notification regarding the tool/mode change, and the notification may be sent to stylus 100. Stylus 100 may be caused to display the color of the icon via a visual indicator 120 and/or the actual icon itself (e.g., such as by an optionally included display 130). Normal processing by device 200 may be resumed thereafter.

If instead a change in tool/note color has been provided, the process flow may continue with determining the target color (or its closest comparative color) and sending the notification to stylus 100. Stylus 100 may be caused to emit light corresponding to the target color. Thereafter, normal processing by device 200 may be resumed.

If instead feedback of a selected or completed action or task is to be provided to the user, the process flow may continue with determining the type of feedback and sending the notification to stylus 100. Stylus 100 may be caused to emit light and/or display a message which manifests the appropriate feedback. Normal processing by device 200 may be resumed thereafter.

Numerous variations on these processes will be apparent in light of this disclosure. As will be appreciated, and in accordance with an embodiment, each of the functional boxes and decision points shown in FIGS. 5A and 5B can be implemented, for example, as a module or sub-module that, when executed by one or more processors or otherwise operated, causes the associated functionality as described herein to be carried out. The modules/sub-modules may be implemented, for instance, in software (e.g., executable instructions stored on one or more computer readable media), firmware (e.g., embedded routines of a microcontroller or other device which may have input/output capacity for soliciting input from a user and providing responses to user requests), and/or hardware (e.g., gate level logic, field programmable gate array, purpose-built silicon, etc.).

Further Considerations

In accordance with one or more embodiments of the present invention, any of the various features/capabilities of stylus 100 can be customized to meet a given user's preferences. For instance, in some cases, a user may customize the settings of a given visual indicator 120, such as color, size, brightness, pattern, duration, etc. In some cases, a user may customize the display settings of a given display 120, such as color, size, font, character set, brightness, contrast, sharpness, displayed language, etc. In some instances, a user may customize settings pertaining to data refreshing (e.g., push, on user command, periodic, scheduled, etc.). In some still other instances, a user may customize settings pertaining to indicator/feedback features, such as type, intensity, frequency, etc. Also, in some cases, a user may customize power usage settings for stylus 100 (e.g., performance priority, energy-saving priority, etc.). Furthermore, in some instances, a user may customize the security settings (discussed below) for stylus 100, such as the elapsed time before lock-out, password requirement, data erasure upon repeated log-in failure, etc. Other user preferences/settings which may be customized for a given stylus 100 will depend on a given application and will be apparent in light of this disclosure.

As will be appreciated in light of this disclosure, it may be desirable in some instances to provide stylus 100 with the ability to generate, store, and/or use configuration/setting profiles based on the preferences of a given user. To that end, stylus 100 may be capable, in some embodiments, of storing one or more user preference profiles (e.g., such as by on-board storage componentry, discussed above). In some other embodiments, a profile of user preferences may be stored on device 200, and stylus 100 may be capable of retrieving or otherwise utilizing that settings profile. As previously noted, stylus 100 may include, in some embodiments, one or more control features 118/132 to which any of a wide variety of functions/capabilities may be assigned. In some such cases, a given control feature 118/132 may be configured, for example, to activate and/or change a given profile of user preferences/settings. In some instances, a given control feature 118/132 may be configured, for example, to alter individual preferences/settings, as desired for a given target application or end-use. Other user profile and setting/preference capabilities of a stylus 100 will depend on a given application and will be apparent in light of this disclosure.

As will be further appreciated in light of this disclosure, it may be desirable, in some instances, to provide stylus 100 with one or more security features, for example, to aid in preventing misuse thereof and/or of device 200. To that end, stylus 100 may be configured, in some embodiments, to alert the user via a given visual indicator 120 that a paired device 200 is off or locked, that an unauthorized attempt at accessing/unlocking the device 200 is occurring, and/or that a secure data wipe/erasure of a paired device 200 has been completed. In some cases in which a display 130 is included, a user may be able to enter and/or change the current password for device 200 from such display 130. Other suitable techniques for securing a stylus 100 to prevent or otherwise reduce misuse thereof will depend on a given application and will be apparent in light of this disclosure.

In some embodiments, stylus 100 may be configured to receive updates to software, firmware, etc., and any alerts/notifications pertinent thereto may be conveyed to the user via a given visual indicator 120. In some cases, updating may be achieved through a hardwired interface/port (e.g., USB, Ethernet, FireWire, disc drive, card drive, etc.) of a given stylus 100. However, the claimed invention is not so limited, as in some instances updating may be achieved wirelessly, for example, using any of the various wireless communications techniques discussed above with reference to stylus 100 and device 200. In some cases, updating of stylus 100 may occur automatically, such as when stylus 100 is engaged (e.g., docked) or otherwise sufficiently proximate to associated device 200. In some other cases, updating may occur upon user input/command. In some instances, stylus 100 may be updated using data received by device 200, while in some other instances stylus 100 may be updated from a different wireless source (e.g., network/cloud 300, etc.). Other suitable techniques for updating stylus 100 will depend on a given application and will be apparent in light of this disclosure.

Numerous variations and embodiments will be apparent in light of this disclosure. One example embodiment of the present invention provides a system including an electronic device having a touch-sensitive surface, and a stylus configured for interacting with the touch-sensitive surface and for wireless communication with the electronic device. In this example embodiment, the stylus includes a visual indicator which emits light in response to a notification received from the electronic device, wherein the visual indicator is visible at any stylus orientation. In some cases, the electronic device comprises at least one of a laptop computer, a tablet, a mobile phone, a smartphone, a personal digital assistant (PDA), an eReader, a portable media player (PMP), a navigation system/global positioning system (GPS), a gaming console, a handheld gaming device, a desktop computer monitor, a television set, and/or an electronic visual display. In some cases, the touch-sensitive surface of the electronic device comprises a touchscreen display. In some cases, the visual indicator is a light ring deployed about a body portion of the stylus. In some cases, a color of light emitted by the visual indicator indicates a level of importance of the notification. In some cases, the visual indicator comprises at least one of a light-emitting diode (LED), an organic light emitting diode (OLED), a polymer light emitting diodes (PLED), an electroluminescent (EL) strip, and/or any combination thereof. In some cases, the notification is indicative of at least one of a message received at the electronic device, a schedule event, a mode of operation of the electronic device, and/or a mode of operation of the stylus. In some cases, the stylus includes a display configured to display at least one of data received by the stylus and/or data transmitted from the stylus. In some such cases, the display of the stylus is a touch-sensitive electrophoretic display and/or the display is configured to display one or more icon-shaped visual indicators. In some cases, at least one of the notification and/or light color emitted by the visual indicator are user-configurable. In some cases, the notification is indicative of a color of a currently active tool mode associated with the stylus. In some cases, the stylus includes at least one of a haptic feedback feature which emits vibration upon at least one of receipt of data by the stylus and/or transmission of data from the stylus, and/or an aural feedback feature which emits sound upon at least one of receipt of data by the stylus and/or transmission of data from the stylus. In some cases, the stylus includes at least one of a memory, a processor, a power supply, a locator/tracker, and/or a speaker. In some cases, the stylus is configured to receive input from a user via a control feature provided with the stylus.

Another example embodiment of the present invention provides a system including an electronic device having a touchscreen display, and a stylus configured for interacting with the stylus touchscreen display and for wireless communication with the electronic device. In this example embodiment, the stylus includes a light ring deployed about a body portion of the stylus and which emits light in response to a notification received from the electronic device. In some cases, a color of light emitted by the light ring indicates a level of importance of the notification. In some cases, at least one of the notification and light color emitted by the light ring are user-configurable. In some cases, the notification is indicative of a color of a currently active tool mode associated with the stylus.

Another example embodiment of the present invention provides a stylus for use with a computing device, including a pen-like housing, a communication module within the housing and configured to wirelessly communicate with a stylus-sensitive computing device, and a visual indicator deployed on the housing and which emits light in response to a notification received from the computing device. In this example embodiment, the visual indicator is visible at any stylus orientation.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:
1. A system comprising:
an electronic device having an electronic touch-sensitive surface that is sensitive to stylus-based input; and
a stylus configured to interact with the electronic touch-sensitive surface and for wireless communication with the electronic device, the stylus being distinct from the electronic device, the stylus including a visual indicator disposed around at least part of a circumference of the stylus which emits light in response to a notification received from the electronic device, the visual indicator being visible at any stylus orientation, the stylus further configured to,
in response to the notification indicating a message has been received at the electronic device, emit a first color of light corresponding to a status of the message as determined at the electronic device, in response to the notification indicating a new tool or mode has been engaged at the electronic device, emit a second color of light corresponding to a color of an icon associated with the new tool or mode, in response to the notification indicating a new color has been selected for an active tool at the electronic device, emit a third color of light corresponding to the new color, and in response to the notification indicating confirmatory feedback from the electronic device, emit a fourth color of light indicative of the confirmatory feedback.

2. The system of claim 1 wherein the electronic device comprises at least one of a laptop computer, a tablet, a mobile phone, a smartphone, a personal digital assistant (PDA), an eReader, a portable media player (PMP), a navigation system/global positioning system (GPS), a gaming console, a handheld gaming device, a desktop computer monitor, a television set, and an electronic visual display.

3. The system of claim 1 wherein the touch-sensitive surface of the electronic device comprises a touchscreen display.

4. The system of claim 1 wherein the visual indicator is a light ring deployed about a body portion of the stylus.

5. The system of claim 1 wherein the first color of light emitted by the visual indicator indicates one or more of a level of importance of the first notification, an application by which the message was received, or a group or individual from which the message was received.

6. The system of claim 5 wherein the application by which the message was received at the electronic device is selected from a group including a social media application, a text message application, an instant message (IM) application, a telephone application, a voicemail application, and an e-mail application.

7. The system of claim 1 wherein the third color of emitted light is a closest comparative color relative to the selected new color.

8. The system of claim 1 wherein the stylus is further configured with a display mounted on the stylus and for displaying at least one of data received by the stylus and data transmitted from the stylus.

9. The system of claim 8 wherein the display of the stylus is a touch-sensitive electrophoretic display.

10. The system of claim 8 wherein the display of the stylus is configured to display one or more icon-shaped visual indicators.

11. The system of claim 1 wherein at least one of the notification and the first light color emitted by the visual indicator are user-configurable.

12. The system of claim 1 wherein at least one of the notification and the fourth light color emitted by the visual indicator are user-configurable.

13. The system of claim 1 wherein the stylus further comprises at least one of:

a haptic feedback feature which emits vibration upon at least one of receipt of data by the stylus and transmission of data from the stylus; and an aural feedback feature which emits sound upon at least one of receipt of data by the stylus and transmission of data from the stylus.

14. The system of claim 1 wherein the stylus further comprises at least one of a memory, a processor, a power supply, a locator/tracker, and a speaker.

15. The system of claim 1 wherein the stylus is further configured to receive input from a user via a control feature of the stylus.

16. A system comprising:

an electronic device having an electronic touchscreen display that is sensitive to stylus-based input; and a stylus configured to interact with the electronic touchscreen display and for wireless communication with the electronic device, the stylus being distinct from the electronic device, the stylus including a light ring deployed about a body portion of the stylus and which emits light in response to a notification received from the electronic device, the stylus further configured to, in response to the notification indicating a message has been received at the electronic device, emit a first color of light corresponding to a status of the message as determined at the electronic device, in response to the notification indicating a new tool or mode has been engaged at the electronic device, emit a second color of light corresponding to a color of an icon associated with the new tool or mode, in response to the notification indicating a new color has been selected for an active tool at the electronic device, emit a third color of light corresponding to the new color, and in response to the notification indicating confirmatory feedback from the electronic device, emit a fourth color of light indicative of the confirmatory feedback.

17. The system of claim 16 wherein the first color of light emitted by the light ring indicates one or more of a level of importance of the first notification, an application by which the message was received, or a group or individual from which the message was received.

18. The system of claim 16 wherein at least one of the notification and the first color of emitted light by the light ring are user-configurable.

19. The system of claim 16 wherein the third color of emitted light is a closest comparative color relative to the selected new color.

20. A stylus for use with a computing device having an electronic touch-sensitive surface that is sensitive to stylus-based input, the stylus comprising:

a pen-like housing;

a communication circuit within the housing and configured to wirelessly communicate with the computing device; and a visual indicator disposed around at least part of a circumference of the housing and which emits light in response to a notification received from the computing device, wherein the visual indicator is visible at any stylus orientation, and in response to the notification indicating a message has been received at the computing device, the visual indicator emits a first color of light corresponding to a status of the message as determined at the electronic device, in response to the notification indicating a new tool or mode has been engaged at the computing device, the visual indicator emits a second color of light corresponding to a color of an icon associated with the new tool or mode, in response to the notification indicating a new color has been selected for an active tool at the computing device, the visual indicator emits a third color of light corresponding to the new color, and in response to the notification indicating confirmatory feedback from the computing device, the visual indicator emits a fourth color of light indicative of the confirmatory feedback.

\* \* \* \* \*